US012579144B2

(12) United States Patent
So et al.

(10) Patent No.: US 12,579,144 B2
(45) Date of Patent: Mar. 17, 2026

(54) USING METADATA TO ASSIST GENERATIVE AI TO ACHIEVE NATURAL LANGUAGE TO SQL QUERY CONSTRUCTION WITH ADDED SECURITY

(71) Applicant: Oracle International Corporation, Redwood Shores, CA (US)

(72) Inventors: Bryan Siu Him So, Hayward, CA (US); Ramchand Raman, Redwood City, CA (US); Nikhil Tungare, Belmont, CA (US); Arvin Tjen, Hayward, CA (US); Clifford Godwin, Alamo, NV (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/812,734

(22) Filed: Aug. 22, 2024

(65) Prior Publication Data
US 2026/0056950 A1     Feb. 26, 2026

(51) Int. Cl.
*G06F 16/2453*     (2019.01)
*G06F 16/2452*     (2019.01)
*G06F 21/62*     (2013.01)

(52) U.S. Cl.
CPC .. *G06F 16/24542* (2019.01); *G06F 16/24522* (2019.01); *G06F 21/6218* (2013.01);
(Continued)

(58) Field of Classification Search
CPC ......... G06F 16/24542; G06F 16/24522; G06F 21/6218; G06F 2221/2113; G06F 2221/2141
See application file for complete search history.

(56) References Cited

U.S. PATENT DOCUMENTS 11,580,251 B1 *   2/2023   Jiang ................... G06F 21/6227
11,934,801 B2 *   3/2024   Rahmani .................. G06F 8/33
(Continued)

FOREIGN PATENT DOCUMENTS

CN        117668160 A      3/2024
CN        117743371 A      3/2024

OTHER PUBLICATIONS

Liu, A Survey of NL2SQL with Large Language Models: Where are we, and where are we going, pp. 1-31, Aug. 9, 2024.*
(Continued)

*Primary Examiner* — Albert M Phillips, III
(74) *Attorney, Agent, or Firm* — Invoke

(57) ABSTRACT

A database query processing method includes receiving a natural language request for information contained within a database from a user in an application session, prompting a large language model to generate a SQL request, and receiving a particular SQL request from the large language model that is parsed to identify a command to access one or more database structures. A security predicate is appended to the command, creating a modified SQL request, to enforce one or more database access constraints constraining a user-authenticated client device that submitted the request that is not enforced in a database session between the application and a database. The modified SQL request is used to access data in the database session, and a visualization of the accessed data is caused to be displayed in the application session.

20 Claims, 9 Drawing Sheets

(52) U.S. Cl.
CPC ................ *G06F 2221/2113* (2013.01); *G06F 2221/2141* (2013.01)

(56) References Cited

U.S. PATENT DOCUMENTS

| | | | | |
|---|---|---|---|---|
| 2016/0224797 | A1* | 8/2016 | Schrock | G06F 21/6227 |
| 2018/0210883 | A1 | 7/2018 | Ang | |
| 2021/0271983 | A1 | 9/2021 | Mohanty et al. | |
| 2022/0156262 | A1* | 5/2022 | Chen | G06F 21/6227 |

OTHER PUBLICATIONS

Python Regular Expressions, pp. 1-9 (Year: 2023).*
Use natural language to execute SQL queries, pp. 1-12, Aug. 4, 2023.*
Community.sap.com, "Using Generative AI to Bring Enterprise Data Context Without Moving the Data: a Technical Exploration", Artificial Intelligence and Machine Learning blogs, Nov. 14, 2023.
Ibm.com, "IBM Knowledge Catalog—Activate data for AI and analytics with intelligent cataloging and policy management", https://www.ibm.com/products/knowledge-catalog, Jun. 26, 2024.
Lian, J. et al., "Chat BI: Towards Natural Language to Complex Business Intelligence SQL", arXiv:2405.00527v1, May 1, 2024.
Microsoft.com, "Index file content and metadata by using Azure AI Search", https://learn.microsoft.com/en-us/azure/architecture/ai-ml/architecture/search-blob-metadata, Jun. 26, 2024.
Microsoft.com, "Microsoft Purview data security and compliance protections for generative AI apps", Article, May 28, 2024, https://learn.microsoft.com/en-us/purview/ai-microsoft-purview.
Microsoft.com, "Search and query an enterprise knowledge base by using Azure OpenAI or Azure AI Search", https://learn.microsoft.com/en-us/azure/architecture/ai-mi/openai/idea/search-and-query-using-openai=service, Jun. 26, 2024.
Panda, S., "Build a robust text-to-SQL solution generating complex queries, self-correcting, and querying diverse data sources", AWS Machine Learning Blog, https://aws.amazon.com/blogs/machine-learning/build-a-robust-text-to-sql-solution-generating-complex-queries-self-correcting-and-querying-diverse-data-sources, Jun. 26, 2024.
Salesforce, "Skyplanner—Einstein and Generative AI: Salesforce Redefines the Future of Modern Business Technology", Nov. 2, 2023.
Salesforce, Inc., "Artificial Intelligence—Einstein Trust Layer", 2024.
Shankar, A., "Architectural Patterns for Text-to-SQL: Leveraging LLMs for Enhanced BigQuery Interactions", https://medium.com/google-cloud/architectural-patterns-for-text-to-sql-leveraging-Ilms-for-enhanced-bigquery-interactions-59756a749e15, Jun. 26, 2024.
U.S. Appl. No. 18/438,224, filed Feb. 9, 2024.

* cited by examiner

100

300A

300B

500

USING METADATA TO ASSIST GENERATIVE AI TO ACHIEVE NATURAL LANGUAGE TO SQL QUERY CONSTRUCTION WITH ADDED SECURITY

BACKGROUND

Information spread across an organization's stored data in a database is often hard to accumulate into useful or insightful visualizations. An organization's data may be spread across multiple applications, and any given application may not always include functionalities to visualize data in ways that a user desires. Giving a user the ability to access all the data of an organization or manipulate an organization's data outside one of the organization's application environments comes with large security risks for an organization.

Database and application tools provide mechanisms for querying and viewing data. The database enforces role-based access controls on user queries to ensure that users do not have access to more data than they are allowed to access, but the specific boundaries of role-based access control as they apply to an individual user in a given scenario can be difficult to determine. Also, the application might not be able to predict what data the user will see as a result of a given database operation.

BRIEF SUMMARY

In some embodiments, a computer-implemented method includes receiving a natural language request for information contained within a database from a user in an application session, prompting a large language model to generate a SQL request, and receiving a particular SQL request from the large language model that is parsed to identify a command to access one or more database structures. A security predicate is appended to the command, creating a modified SQL request, to enforce one or more database access constraints constraining a user-authenticated client device that submitted the request that is not enforced in a database session between the application and a database. The modified SQL request is used to access data in the database session, and a visualization of the accessed data is caused to be displayed in the application session.

In one embodiment, a computer-implemented method includes receiving a natural language request for information contained within a database, categorizing the natural language request in a particular category from a plurality of categories, and selecting a large language model and one or more database structures for which a SQL request is to be directed based in part on the particular category. The selected large language model is prompted to generate a SQL request directed to the selected set of one or more database structures, and the received SQL request is validated for the particular category. The validated particular SQL request is used to access data within the database, and one or more visualizations are caused to be displayed based at least in part on a result of the validated particular SQL request.

In some embodiments, a computer-implemented method includes receiving, in an application session between an application and a user-authenticated client device, a natural language request for information contained within a database, the application constraining the user-authenticated client device based on one or more database access constraints that are not enforced in a database session between the application and a database, generating a prompt, including one or more items of metadata about at least one database structure of the one or more database structures, to a large language model to generate a SQL request identifying one or more database structures for which the SQL request is to be directed, prompting the large language model with the prompt, receiving a particular SQL request from the large language model as a result of the prompt, parsing the particular SQL request to identify a command to access one or more particular database structures for which at least one database access constraint of the one or more database access constraints applies, appending a security predicate enforcing the one or more database access constraints to the command in the particular SQL request to generate a modified SQL request, using the modified SQL request to access data in the database session, and causing display, in the application session, of one or more visualizations based at least in part on a particular result of the modified SQL request.

In a further embodiment, the one or more database structures corresponds to a pre-defined data view, determined based at least in part on a state of the application session. and a method may also include determining the security predicate based at least in part on the pre-defined data view.

In a further embodiment, a method may also include parsing the natural language request to detect a context of the natural language request, selecting a pre-defined data view corresponding to the context of the natural language request, and determining the security predicate based at least in part on the pre-defined data view.

In a further embodiment, a method may also include generating the security predicate, at least in part by accessing a structured object including the at least one database access constraint and transforming the at least one database access constraint into a WHERE clause. The security predicate may be based at least in part on the WHERE clause.

In a further embodiment, a database session may be a second database session, the prompting the large language model may be performed in a first database session separate from the second database session, and the particular result may be inaccessible in the first database session.

In a further embodiment, the database may be a second database, the database session may be a second database session, and a method may also include test-executing the modified SQL request against a first database in a first database session before using the modified SQL request to access the data from the second database in the second database session, the first database including at least some data values from the particular result.

In a further embodiment, the one or more data values of the at least one database structure may not be accessible to the large language model and the one or more items of metadata may include one or more items of natural language description that describe one or more data characteristics of the at least one database structure and are stored in association with the at least one database structure even though one or more data values of the at least one data structure are not accessible to the large language model.

In a further embodiment, a method may include, before generating the prompt, parsing the natural language request to identify one or more sensitive values, and replacing the one or more sensitive values with one or more default values.

In a further embodiment, the parsing may use a tuple of a regular expression and a marker.

In a further embodiment, the one or more visualizations may include one or more graphical elements representing one or more aggregate values from a plurality of values of the particular result.

In a further embodiment, a method may include receiving a natural language request for information contained within a database, categorizing the natural language request in a particular category within a plurality of categories, selecting a large language model and one or more database structures for which a SQL request is to be directed based at least in part on the particular category, generating a prompt, identifying the selected set of one or more database structures for which the SQL request is to be directed and including one or more items of metadata about at least one database structure of the one or more database structures, to the selected large language model to generate a SQL request, prompting the selected large language model with the prompt, receiving a particular SQL request from the selected large language model as a result of the prompt, validating the particular SQL request for the particular category, using the validated particular SQL request to access data within the database and causing display of one or more visualizations based at least in part on a particular result of the validated particular SQL request.

In a further embodiment, the selecting the large language model is based on feedback provided on a plurality of large language models used for natural language requests in the particular category.

In a further embodiment, a method may include selecting the set of one or more database structures based on feedback provided on a plurality of combinations of database structures used for natural language requests in a particular category.

In a further embodiment, a method may include selecting a plurality of combinations of large language models to process the natural language request, comparing outputs of the plurality of combinations of large language models, and, based at least in part on the comparing, selecting one of the outputs as the validated particular SQL request.

In a further embodiment, a method may include selecting a plurality of combinations of database structures to use for processing the natural language request, comparing outputs of the selected large language model using the plurality of combinations of database structures, and, based at least in part on the comparing, selecting one of the outputs as the validated particular SQL request.

In a further embodiment the natural language request is received in an application session between an application and a user, feedback on the particular SQL request is received in the application session, and a method may include updating metadata for the particular category based at least in part on the feedback.

In a further embodiment, an application session between an application and a user, when the natural language request is received, is associated with the particular category and the profile is stored in association with the particular category and a method may include storing a profile, used to establish a session with the selected large language model, that specifies the selected large language model or the selected one or more database structures, and selecting the profile from a plurality of profiles based at least in part on the particular category.

In a further embodiment, the database is a second database instance, the using the validated particular SQL request occurs in a second session with the second database instance, and a method may also include configuring a first database instance to store the selected one or more database structures in response to selecting the one or more database structures, and prompting the selected large language model in a first session with the first database instance.

In a further embodiment, a method may include using a score to select the large language model or the one or more database structures, storing a result of validating the particular SQL request for the particular category as metadata for the particular category, and adjusting the score for the large language model or the set of one or more database structures based at least in part on the result of the validating.

In a further embodiment, the categorizing the natural language request in the particular category within the plurality of categories may be based at least in part on parsing content of the natural language request to detect one or more key terms or phrases.

In a further embodiment, the categorizing the natural language request in the particular category within the plurality of categories is based at least in part on metadata that indicates an originating interface of the natural language request is mapped to the particular category.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
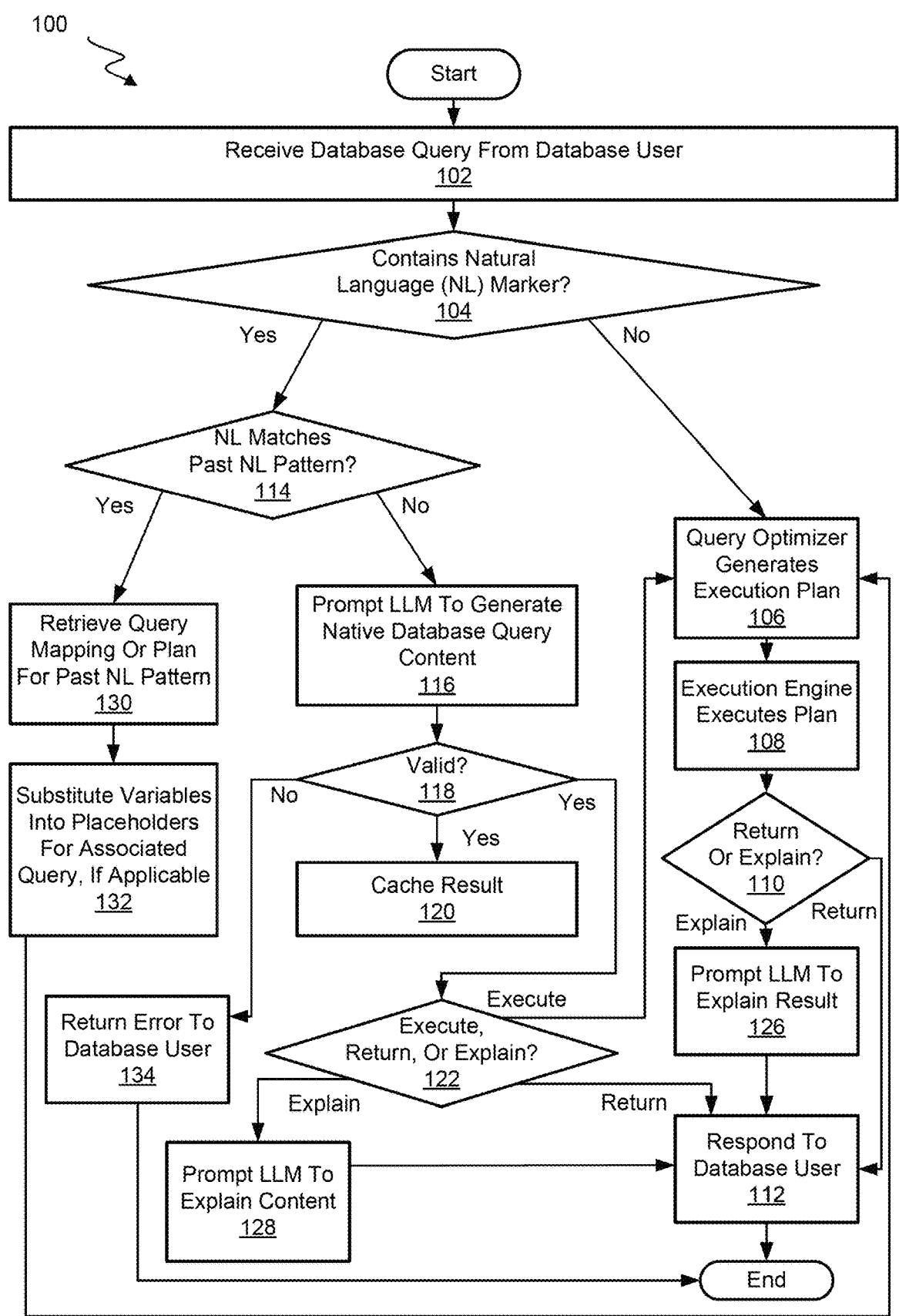
FIG. 1 illustrates a flow chart for processing queries that may contain natural language portions for translation to native database query content.

A database query processing method includes receiving a natural language request for information contained within a database, categorizing the natural language request, and, based on the category, selecting a large language model and one or more database structures for which a SQL request is to be directed. The large language model is prompted to generate a SQL request, and a security predicate is added to the SQL request. The SQL request is validated and used to access data within the database, which is displayed in a visualization to a user. In various embodiments, the database query processing service is implemented using non-transitory computer-readable storage media to store instructions which, when executed by one or more processors of a computer system, cause display of the user interface and processing of the received inputs for data query processing. The data query processing may be implemented on a local or cloud-based computer system that includes processors and a display for showing the user interface to a user for data query processing. The computer system may communicate with client computer systems for data query processing.

A description of data query processing techniques is provided in the following sections:

FAST PATH PROCESSING OF DATABASE QUERIES
DETECTING DATABASE QUERIES THAT CONTAIN NATURAL LANGUAGE
GENERATING QUERY PROMPT FOR THE LARGE LANGUAGE MODEL
METADATA AND REQUEST PARAMETERS FOR THE LARGE LANGUAGE MODEL
SELECTING A PROFILE FOR THE LARGE LANGUAGE MODEL
RECEIVING AND VALIDATING GENERATED QUERY CONTENT OUTPUT
APPENDING SECURITY PREDICATE

PERFORMING OPERATION(S) USING THE GENERATED CONTENT
RETURNING GENERATED NON-QUERY CONTENT
SHOWING AND/OR EXPLAINING GENERATED QUERY CONTENT
USING GENERATED QUERY CONTENT FOR QUERY EXECUTION
PROVIDING RESULTS OF QUERY EXECUTION
GENERATING RESULTS PROMPT FOR LARGE LANGUAGE MODEL, AND PROVIDING GENERATED RESULTS CONTENT
CACHING QUERY CONTENT
COMPUTER SYSTEM ARCHITECTURE

The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Fast Path Processing of Database Queries

Various database query processing services exist to efficiently process native database queries, such as queries formatted according to any of the various forms of Structured Query Language (SQL), ArangoDB Query Language (AQL), MongoDB Query Language (MQL), Salesforce Object Query Language (SOQL), or Datalog. For example, Oracle Database® receives and processes SQL queries using a variety of optimizations and an efficient architecture that allows a high throughput of queries into the database query processing service and a high throughput of responses out of the database query processing service. The native database query languages are developed to allow database query processing services to perform predictable operations for given commands, optionally maintaining transactional consistency and/or allowing for concurrency in query processing. These predictable operations have been mapped to efficient pathways or execution plans of sub-operations needed to accomplish the given commands in different scenarios against database(s) or underlying data structure(s). For a given query, the database optimizer can select an execution plan of a plurality of available execution plans that each cause sub-operations of the query to be executed in different orders, using different data structures, or otherwise differently. The execution plan is selected using statistics, heuristics, or machine learning to result in a selected execution plan that is predicted to be fastest or most efficient among the plurality of execution plans considered.

When a database query is received that leverages native database query commands, with natively specified constraints and conditions on how the commands are to be processed against database structure(s), the database query processing service uses the efficient pathways for the given commands and conditions to execute the query and provide a response, often with an emphasis on optimizing resource efficiency, response time, accuracy, throughput, and/or transactional consistency. The database query processing service may have a query optimizer and execution engine specially designed with these emphases with respect to given native commands and conditions that are valid for a supported native query language. These native execution pathways for executing commands that perform predictable operations result in high levels of efficiency that result from query optimization and execution innovations targeted at improving these efficiencies of the native query processing pipeline. For this reason, native query execution using native commands and native conditions or constraints on the commands, and referencing native database structures is referred to herein as fast path processing of database queries, which is unencumbered by the translation of less predictable natural language into efficient and predictable native database queries. However, native database query processing is also more rigid than natural language processing in that such widely variant and less predictable natural language statements are not deterministically mapped to native database query commands, constraints, and existing database objects. The intent of natural language may be ambiguous, and determining the intent may involve more resources than just executing the native commands against existing objects.

The database query processing service may handle a hybrid query workload with native database commands as well as with natural language statements. The native database commands may be sent on a fast path for execution, and the natural language statements may be sent to a large language model for further analysis. In one embodiment, the database query processing service operates on computing device(s) to receive one or more database queries comprising command(s) (e.g., select, insert, update, or delete statements), target source(s) (e.g., column(s) specified after the command and/or database structure(s) specified in from clauses), and/or other condition(s) (e.g., filtering conditions in the where clause, such as conditions specified using expressions including Boolean, numeric, or date-based expressions) that are natively valid for a database query language to retrieve data from database structure(s) that are referenced in the one or more database queries without using a large language model to generate natively valid replacement database query content. In one embodiment, a received query may include a command such as "select" and a condition such as a target source or database structure, "salary." In another embodiment, the received query may include a where clause that further specifies that the selected items must have "salary >$30,000".

These one or more queries may be executed using this pathway as they do not contain natural language markers accompanying natural language portions of the queries to transform into database queries. The database query processing service may cause execution of these one or more queries to retrieve data from the database structure(s), for example, based on a query execution plan generated by a query optimizer. The data may be retrieved or accessed without using a large language model to generate natively valid replacement database query content between receiving the one or more database queries and execution of the one or more database queries. No such natively valid replacement database query content is needed for the one or more database queries that do not contain a natural language marker and accompanying natural language portions to transform into database queries.

FIG. 1 illustrates a flow chart of example process 100 for processing queries that may contain natural language portions for translation to native database query content. Process 100 begins in block 102, where a database query is received from a database user. In block 104, a determination is made as to whether the database query contains a natural language marker. In one embodiment, if the natural language marker is not read and evaluated (found) in the query as received, no additional determination is needed to proceed with the fast path for query execution. In block 106, if the received query does not contain a natural language marker, the query optimizer generates an execution plan for executing the query against one or more underlying database structures. In block 108, execution engine executes the plan to, for example, retrieve data from the underlying database structures. Then, in block 110, process 100 determines whether to return or explain the query results. If the results are returned without LLM explanation, process 100 may efficiently conclude to respond to database user in block 112 without utilizing any LLM resources.

If process 100 determines an explanation is requested by the initial query or by the user's query processing settings, process 100 may continue to block 126 to prompt an LLM to explain the query result. Then, in block 112, the database query processing service may respond to the database user with the natural language explanation of the result and/or the result set.

Figure 4:
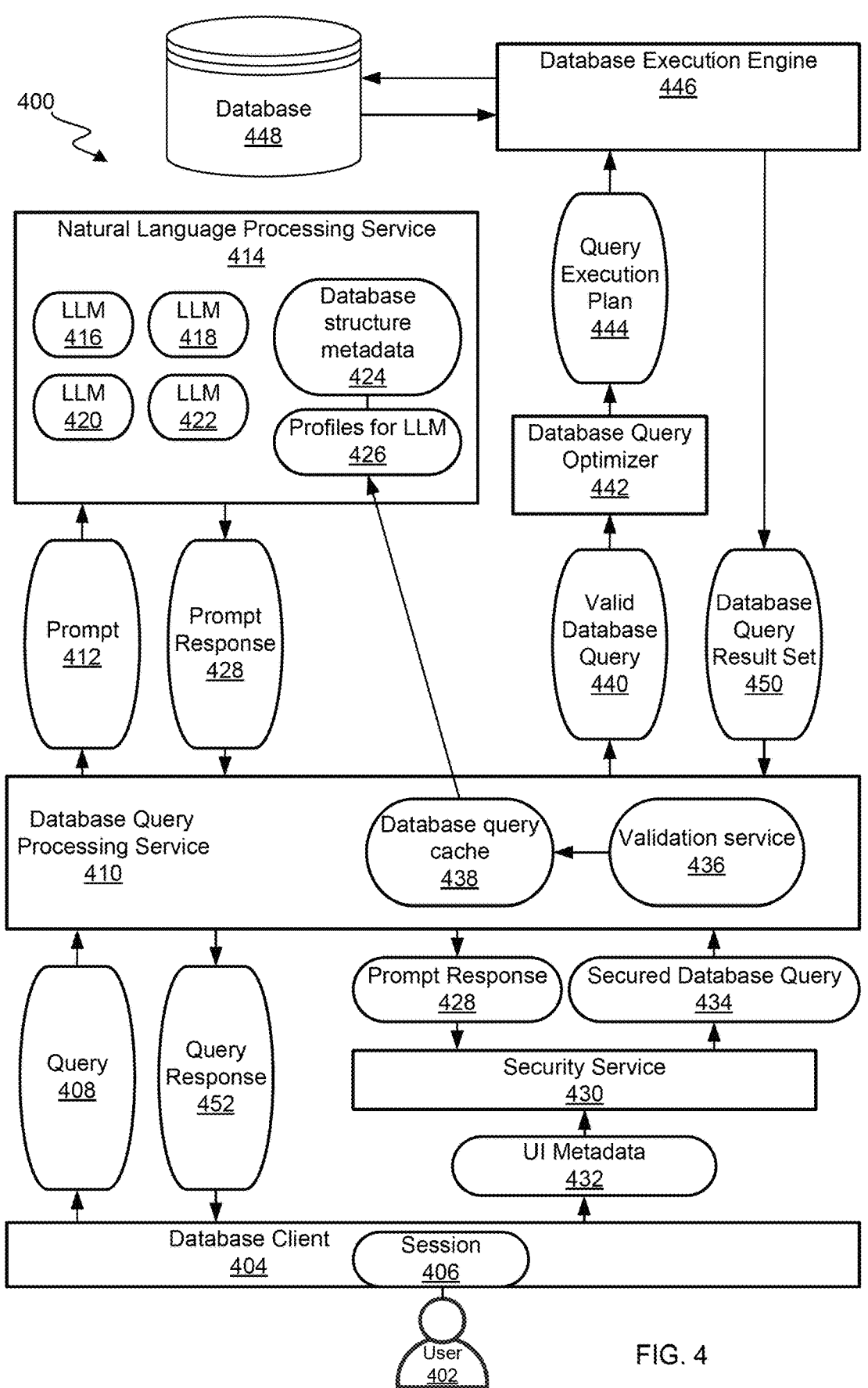
FIG. 4 illustrates a system diagram for a computer system that processes queries that may contain natural language portions for translation to native database query content.

FIG. 4 illustrates a system diagram for a computer system that processes queries that may contain natural language portions for translation to native database query content. As shown, a user 402 interacts with a database client 404 via a database client session 406. The database client 404 submits query 408 to database query processing service 410. Initial query 408 may be referred to herein as the "received query" or the "initially submitted query." If query 408 is a valid database query and does not contain a natural language marker, such valid database query 440 may be sent to database query optimizer 442, which generates an execution plan 444 for execution by a database execution engine 446 against database 448. Execution by the database execution engine 446 against database 448 produces a database query result set 450, which may then be included in whole or in part in query response 452 by database query processing service 410.

Detecting Database Queries that Contain Natural Language

In one embodiment, the database query processing service detects a natural language marker in one or more of the user queries received. The natural language marker may be any indication in a received query, compliant with a native query language of the received query as understood by the database query processing service, that the received query contains a portion of natural language content. In one example, the marker is a specific keyword or syntax occurring within a database query that conforms to a database query language. For example, the marker may be "AI" as a target of a "select" command, such as "select AI how many employees are in North America?;" or "select AI what are our top 10 streamed movies that were released after 2010?;" In these example, natural language "how many employees are in North America?" and "what are our top 10 streamed movies that were released after 2010" occur after the marker "select AI". Other markers are also possible, such as "select artificial intelligence," "select LLM," "select large language model," "select NL," or "select natural language."

Markers may also be used with commands other than a select statement, such as "find AI," "retrieve LLM," or "answer NL." These compound markers may include a native query command and a target of the native query command. Singular markers may also be used as native to the query language, such as LLM or NLQuestion, without providing any additional target, as long as the database query processing service is configured to understand the singular markers without additional targets of the command being required.

Additional markers may be common terms that occur at the beginning of natural language statements that are otherwise invalid in the native query language but valid for signaling natural language portions, such as keywords associated with questions (e.g., "who," "what," "when," "where," "why," or "how"). For example, a query containing "select * from Employees where Salary >$50,000 and who is the employee with the highest salary?" might be processed to detect one native sub-query "select * from Employees where Salary >$50,000," and one natural language sub-query "who is the employee with the highest salary?" The native subquery may be executed as-is using the native select command and the native references to database structures (signaled by "from") and other conditions (signaled by "where"), and the natural language sub-query may be passed to a large language model to generate a native query that answers the natural language sub-query.

Any markers may be used as long as the query processing service is configured to look for the marker and look for natural language occurring relative to the marker. For example, the natural language may occur immediately after the marker and may be separated by spaces, within quotation marks, within brackets, braces, or parenthesis, with a beginning marker (e.g., a line break or ":") and/or an end marker (e.g., ";" or a line break), etc.

One consideration for choosing an appropriate marker, whether singular (single word or phrase trigger) or compound (multi-word or word pattern trigger), is that the marker does not frequently occur in queries even when natural language processing is not desired. If the marker did frequently occur in queries even when natural language processing was not desired, the marker might lead to natural language processing of content that was not intended to be processed as natural language. Another consideration is that the marker is not onerously long or complicated so that a query author can remember, use, and efficiently transmit the marker when drafting and executing new queries. In various embodiments, the same marker(s) may be used in a database service that supports multiple tenants, such that users across different companies and domains can learn to interact with the database in a consistent manner that goes with the users as they move from company to company and industry to industry.

In one embodiment, the natural language marker is at the beginning of a query or subquery, such as occurring as part of a "select" statement, so that the database query processing service may detect that the natural language marker is being used efficiently without processing other content that occurs in a remainder of the query.

Referring back to FIG. 1, if the database query processing service determines that the received database query contains a natural language marker in block 104, then, in block 114, the database query processing service may determine whether the natural language portion of the received query matches a past natural language pattern. If such patterns are maintained, as described later, the database query processing service may proceed to a fast path execution that does not involve re-prompting the large language model in blocks 130-132 and blocks 106-112. If such patterns are not present or not maintained, the database query processing service may proceed to block 116 to prompt an LLM to generate native database query content. If the native database query content generated is valid, as determined in block 118, the database query processing service may proceed to cache the result in block 120 if patterns of results are maintained by the database query processing service. The database query processing service may also proceed to determine whether the resulting database query content is to be executed, returned, or explained in block 122. If the resulting database query content is to be executed, process 100 may proceed to query optimization in block 106, execution in block 108, and resulting operations in blocks 110-112 to return a result of the query execution to the database user, or blocks 110, 126, and 112 to return an explanation of the query execution results to the database user.

If the resulting database query content is to be returned, process 100 may proceed to return the resulting database query content to the database user in block 112 without computing the database query against the underlying database structures in blocks 106-108.

If the resulting database query content is to be explained, process 100 may proceed to block 128 to prompt an LLM to explain the resulting database query content in natural language in addition or alternative to the query syntax, and return a resulting explanation of the database query content to the database user in block 112 without executing the database query content against underlying database structures in blocks 106-108.

Figure 2:
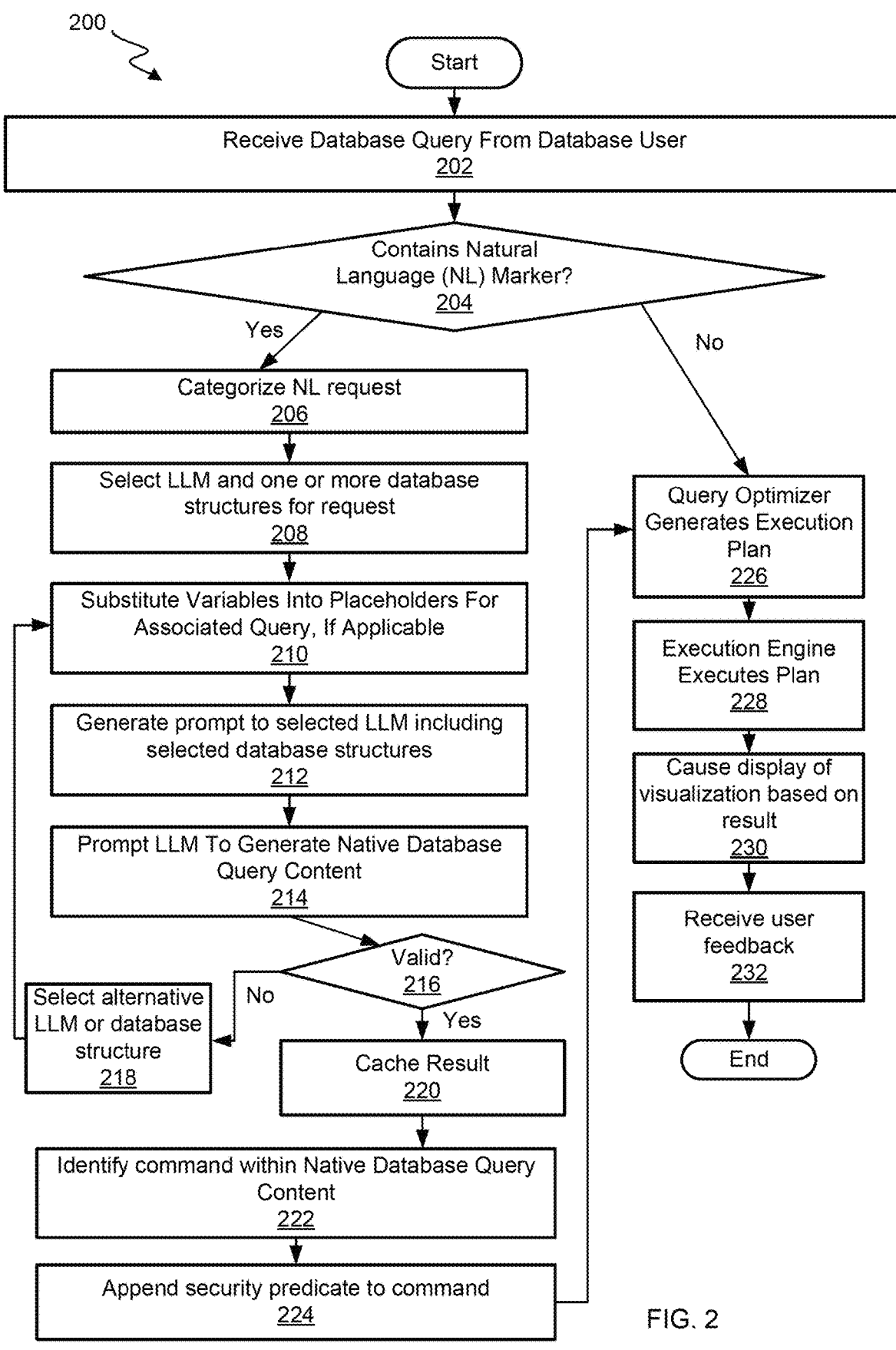
FIG. 2 illustrates a flow chart for further embodiments of processing queries that may contain natural language portions for translation to native database query content.

FIG. 2 illustrates a flow chart of example process 200 for processing queries that may contain natural language portions for translation to native database query content. Process 200 beings in block 202, where a database query is received from a database user. In block 204, a determination is made as to whether the database query contains a natural language marker. In one embodiment, if a natural language marker is found in the query as received, the process 200 categorizes the natural language request in block 206 in order to better address the database query.

Referring back to FIG. 4, a database client may submit query 408 to database query processing service 410. If query 408 contains a natural language marker and a natural language portion, prompt 412 may be generated to natural language processing service 414, which may include one or more large language models 416, 418, 420, and/or 422 to process the natural language separately, in combination, in series, or in parallel to generate one or more prompt responses 428. Database query processing service 410 selects a prompt response that contains a valid database query 440 to pass to database query optimizer 442. Database query optimizer 442 generates an execution plan 444 for execution by a database execution engine 446 against database 448. Execution by the database execution engine 446 against database 448 produces a database query result set 450, which may then be included in whole or in part in query response 454 by database query processing service 410.

Additional back-and-forth prompts 412s and prompt responses 428s may be performed to explain queries generated by LLMs 416, 418, 420, and/or 422, explain database query result sets 450s, and/or provide responses to natural language inputs without reference to database 448, such as in a chat mode. These additional uses of LLMs will be described later in greater detail.

In a received query such as query 408, the natural language marker may overlap with valid native database queries against valid data structures, in which case a determination may be made about whether the marker is being used to mark natural language or trigger native database query functionality. In one embodiment, after detecting the natural language marker, the database query processing service determines whether or not the target portion of the natural language marker is being used to reference a column of a table stored in the database or some other existing database structure, in which case the database query processing service triggers fast path processing of the database query according to natively understood commands. For example, the database query may include "select ai from skills where region='North America';" to indicate that the value of the "ai" column of the "skills" table should be selected for all rows where the region column is equal to "North America." The database query processing service may detect that the natural language marker's target portion natively references an existing database structure and execute the query rather than passing the query to a natural language processing service, for example, provided by large language model(s).

If the skills table does not exist in the example, the database query processing service may pass the query to the natural language processing service for refinement into a native database query that references existing database structures. Passing queries that cannot be executed as-is to the natural language processing service may help the database query processing service to correct and execute queries that are not initially perfectly formatted or where database structure names are not remembered or are mistyped. In another embodiment, if the database query processing service cannot determine whether the natural language processing service is intended to be invoked or not, the database query processing service may provide an error message in response to the query, indicating that the query is not properly formatted to invoke the natural language processing service but is also not properly formatted for execution against existing database structures. For example, such error message may be triggered when the database query contains "select ai from" as the prefix, unless the structure referenced after "from" is an existing database structure with an existing column name matching the "ai" or target portion of the marker.

For a similar query, "select ai what are the most common skills of my employees in North America;" the database query processing service may detect that the query is not referencing an existing database structure but instead contains natural language. As a result, the query is passed to the natural language processing service to generate a native database query for further processing.

In one embodiment, the database query processing service detects natural language with or without a marker by processing the initial query to determine whether the query content is valid and, if not valid, processing the invalid portion to determine whether it poses a question for a large language model. For example, a large language model could be prompted first to determine whether the invalid portion of the query poses a question and second to determine an answer to the question. Or, one prompt could determine both whether the invalid portion poses a question, and, if so, the answer, which may be in the form of a valid database query to find the answer when executed against a database. In another embodiment, heuristics and/or machine learning are applied to the invalid portion of the query to determine whether the invalid portion contains question-like aspects, such as keywords associated with questions (e.g., "who," "what," "when," "where," "why," or "how"). Any detected natural language sub-query may be passed to a large language model to generate a native query that answers the natural language sub-query.

Such an approach would involve a back-and-forth with either question-determining heuristics or the large language model, possibly after a validity check has already occurred. In another embodiment, certain keywords associated with questions may be used alternatively or additionally to native markers in the query language to serve as marking natural language text in the query even before or without previously performing a validity check. This approach poses some risk, as question terms could otherwise appear in object names of a native query, but may be appropriate in certain implementations where the question terms are not otherwise present in the native queries.

In one embodiment, by using a marker that triggers additional large language model functionality when present and avoids additional large language model functionality when absent, the database query processing service can promote efficiency of query handling for large sets of queries, some of which include the marker and some of which do not include the marker. The queries that do not include the marker are efficiently executed based on the query received, for example, using query optimization (including, for example, query re-writing and execution plan generation) to further improve the efficiency of performing the query and efficiently avoiding a cost of using any large language models to transform natural language into native query content.

Queries that do include the marker are also efficiently executed based on detection of the marker early in the query handling process, and efficient utilization of the large language model(s) and/or a cache of past query content generated by large language models to resolve natural language that is marked in the query as natural language rather than native query content. Replacement native query content may be retrieved from the large language model(s) early in query processing so the replacement native query content may be efficiently executed if needed. This database query processing service architecture promotes efficient utilization of the data structures and processes that make up the large language model(s) as well as the data structures and processes that make up the database query optimizer and database query execution engine.

If the large language model(s) are connected over a network, interaction with the large language model(s) may impose a network connection penalty (for example, 1-200 ms) in terms of the amount of time to send data to the large language model(s) and receive data from the large language model(s). Even if the large language model(s) are managed locally to the database query processing service with minimal connection overhead, interaction with the large language model(s) may involve complex evaluation of natural language using a multi-level neural network that imposes a processing penalty in terms of the amount of time and resources to generate a native database query from natural language input (for example, 1-30,000 ms). Such penalties, if incurred on every database query, could derail the database query processing service and severely limit the otherwise important high-throughput capabilities. Incurring such penalties may be avoided when the database query does not contain a natural language marker, while the benefits provided from the interactions that impose such penalties may be enjoyed when the database query does contain the natural language marker.

In various embodiments, large language model(s) may be prompted with non-deterministic natural language questions, information that is not natively understood by the database query optimizer or execution engine, and/or information that does not reference any underlying database structures, and the large language model(s) may generate query content including deterministic query content, query content that is natively understood by the database query optimizer or execution engine, and/or information that references underlying database structures from which to retrieve data. The generated query content may be efficiently executed by a query execution engine, for example, after query optimization, to retrieve content from underlying database structures referenced in the generated query content, if any.

Generating Query Prompt for the Large Language Model

Whether or not the database query workload contains native database queries, based at least in part on determining that a particular database query contains the natural language marker and accompanying natural language text, the database query processing service may generate a prompt to a particular large language model requesting natively valid replacement database query content based at least in part on the natural language text in the particular database query. In one embodiment, the database query processing service provides the prompt to a large language model or natural language processing service. The prompt may include natural language text from the query received by the database query processing service, as well as additional text in the form of a preamble or prefix to the received natural language text or a suffix to the received natural language text, and/or other metadata.

The additional text may include directives passed into the large language model API about producing a database query that is native to a particular database query language such as SQL, or even more specifically SQL compatible to Oracle Database or any other database query language or database provider. The additional text may also include directives to produce a safe translation to a native database query, avoiding malicious native database queries. For example, the directives may instruct the large language model to avoid dynamic markup language (DML) statements or other write operations, or operations that impact database policies, or denial of service attacks that overconsume database resources. The additional text may also be tuned for different large language models to account for different tendencies of the different large language models in generating native database query content.

Figure 5:
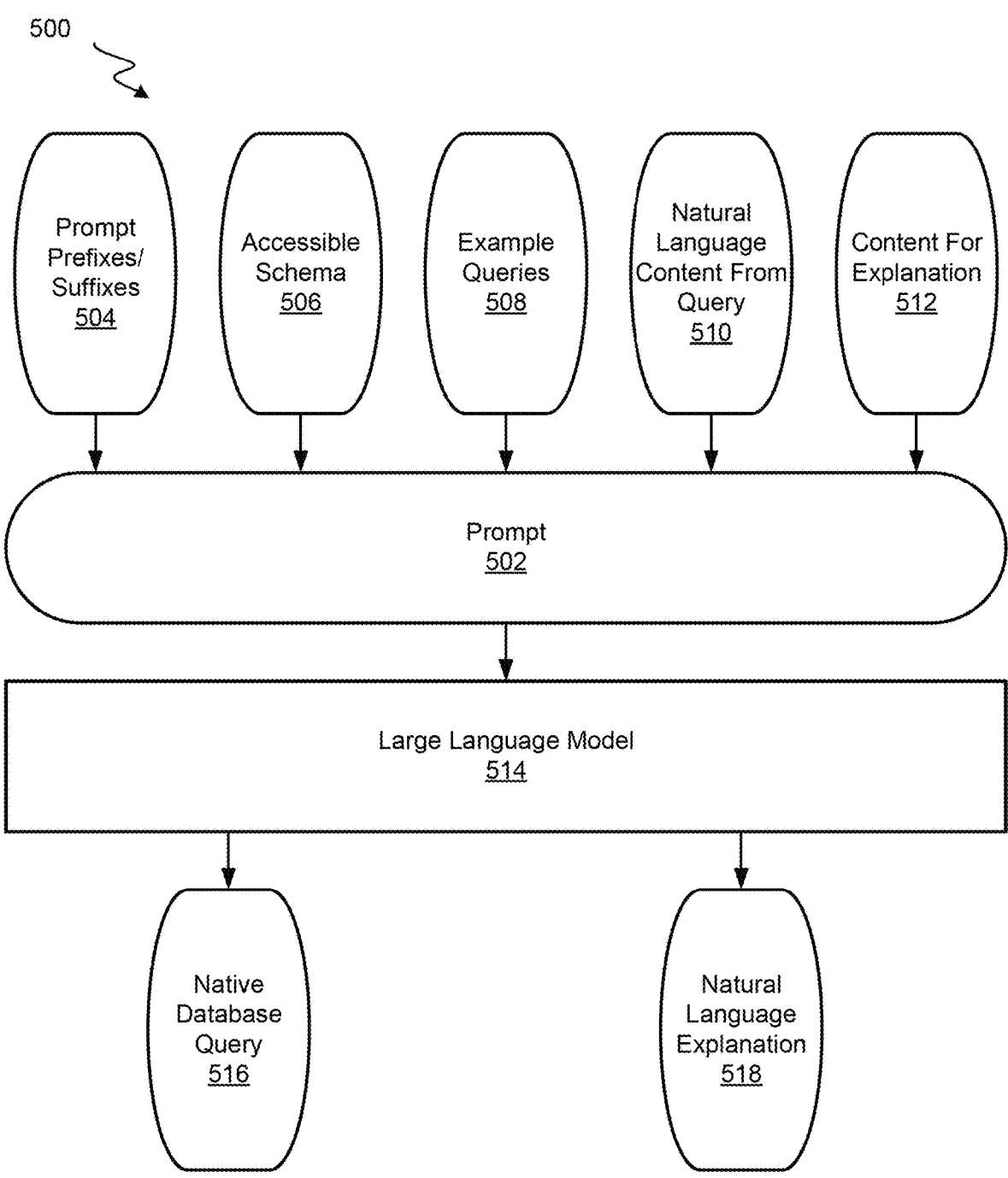
FIG. 5 illustrates a prompt generation pipeline for generating a specialized prompt for a large language model.

FIG. 5 illustrates a prompt generation pipeline 500 for generating a specialized prompt for a large language model. As shown, prompt 502 may be derived from and/or include prompt prefixes and/or suffixes 504, accessible schema 506, examples queries 508, natural language content from the received query 510, and/or content for further explanation 512. Prompt 502 may be fed to large language model 514 to produce native database query 516 and/or natural language explanation 518.

To illustrate an example prompt in more detail, a database query processing service may receive an initial query that includes a natural language marker and natural language "find how many customers." The database query processing service may form different prompts depending on which large language models are used. In a first example, the database query processing service creates the following prompt for an OpenAI large language model:

First Example OpenAI Prompt

```
[
    {
        "role": "system",
        "content": "###Oracle SQL tables with their prop-
            erties:"
    },
    {
        "role": "system",
        "content":        "#\"ADMIN\".\"CUSTOMERS\"
            (\"JOIN_DATE\" DATE, \"CUST_ID\" NUM-
            BER, \"SALES\" NUMBER, \"LAST_NAME\"
            VARCHAR2(30),    \"FIRST_NAME\"    VAR-
            CHAR2(30))"
    },
```

```
    {
        "role": "user",
        "content": "Always use table alias and easy to read
            column names, only type Oracle SQL and nothing
            else to find how many customers"
    }
]
```

In the first example, the schema information and other metadata are included in the prompt. The schema information identifies table names, such as the Customers table, as well as column names and types, such as column CUST_ID with a NUMBER type. In one embodiment, the database query processing service retrieves the available schema information for the user based on one or more roles, profiles, and/or privileges of the user in the database, and determines which objects are available to the user for query execution based on the user's role(s), profile(s), and/or privilege(s). The available tables may then be added to the schema information, optionally in a hierarchical format, which may be marked up as XML or JSON, to show references between objects. The prompt also includes guidance and constraints for the large language model to use when determining the resulting native database query, such as "Always use table alias and easy to read column names," and "only type Oracle SQL and nothing else."

In a second example, the database query processing service creates the following prompt for a Cohere large language model:

Second Example Cohere Prompt

```
    ###Oracle SQL tables with their properties:
    #"ADMIN"."CUSTOMERS"  ("JOIN_DATE"  DATE,
        "CUST_ID"    NUMBER,    "SALES"    NUMBER,
        "LAST_NAME"  VARCHAR2(30),  "STATE"  VAR-
        CHAR2(30), "FIRST_NAME" VARCHAR2(30))
```

Read the above table description and write an Oracle SQL to answer the following question. Always use table alias and easy to read column names. Do not write anything else except the SQL query.

Question: Find how Many Customers

In the second example, the schema information and other metadata are included in the prompt. The schema information identifies table names, such as the Customers table, as well as column names and types, such as column CUST_ID with a NUMBER type. The prompt also includes guidance and constraints for the large language model to use when determining the resulting native database query, such as "Read the above table description and write an Oracle SQL to answer the following question," "Always use table alias and easy to read column names," and "Do not write anything else except the SQL query."

Referring to FIG. 1, the database query processing service prompts a large language model to generate native database query content with the generated prompt in block 116.

Figure 3A:
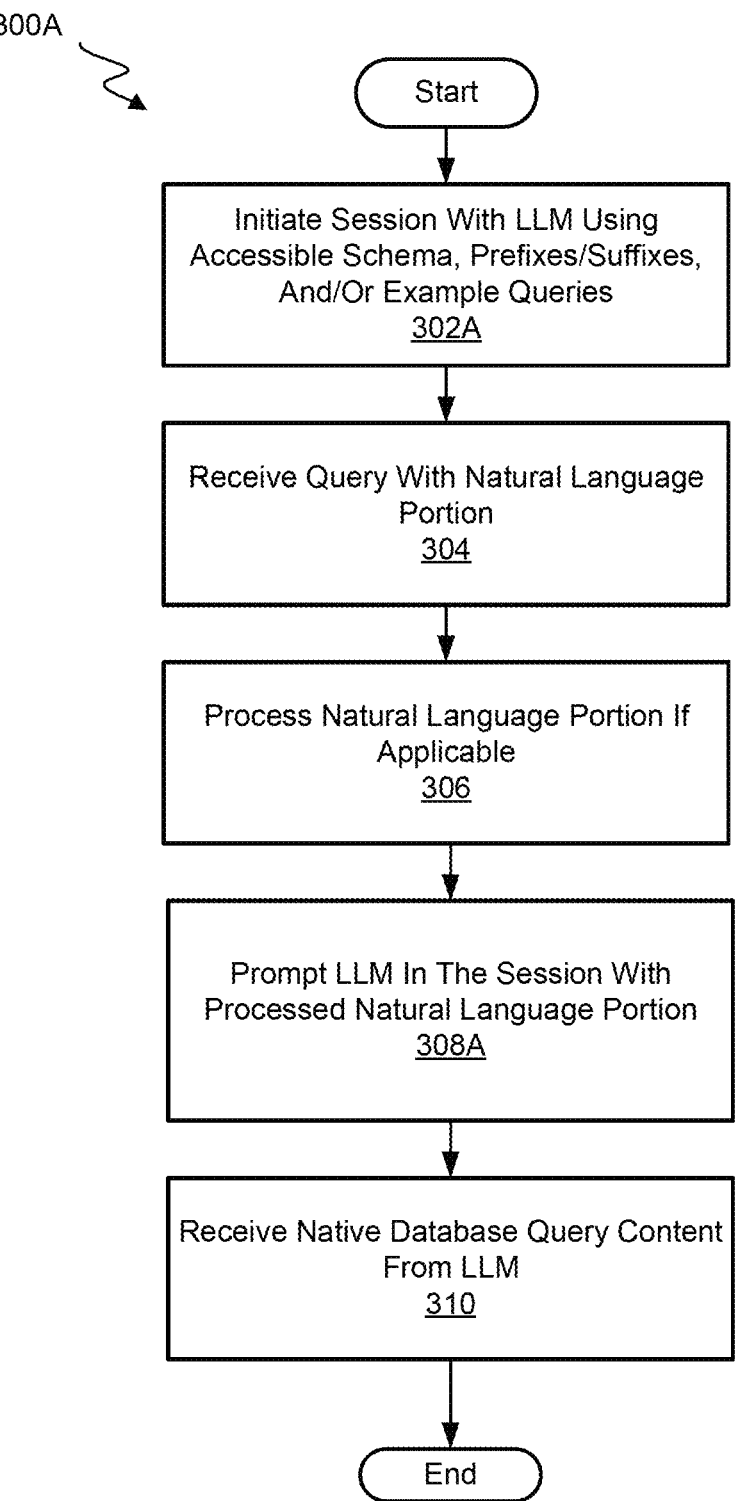
FIG. 3A illustrates a flow chart for handling a natural language portion of a query with a preconfigured large language model session.

FIG. 3A illustrates a flow chart showing example process 300A for handling a natural language portion of a query with a preconfigured large language model session. As shown, in block 302A, a session is initiated with an LLM using accessible schema, prefixes and/or suffixes, and/or example queries. Then, a database query processing service receives a query in block 304 with a natural language portion. The natural language portion is processed and prepared, to correct formatting, spacing, and remove stop words, if applicable, in block 306. In block 308A, the database query processing service prompts an LLM in the session with the processed natural language portion. Process 300A concludes when the database query processing service receives native database query content from the LLM in block 310.

Figure 3B:
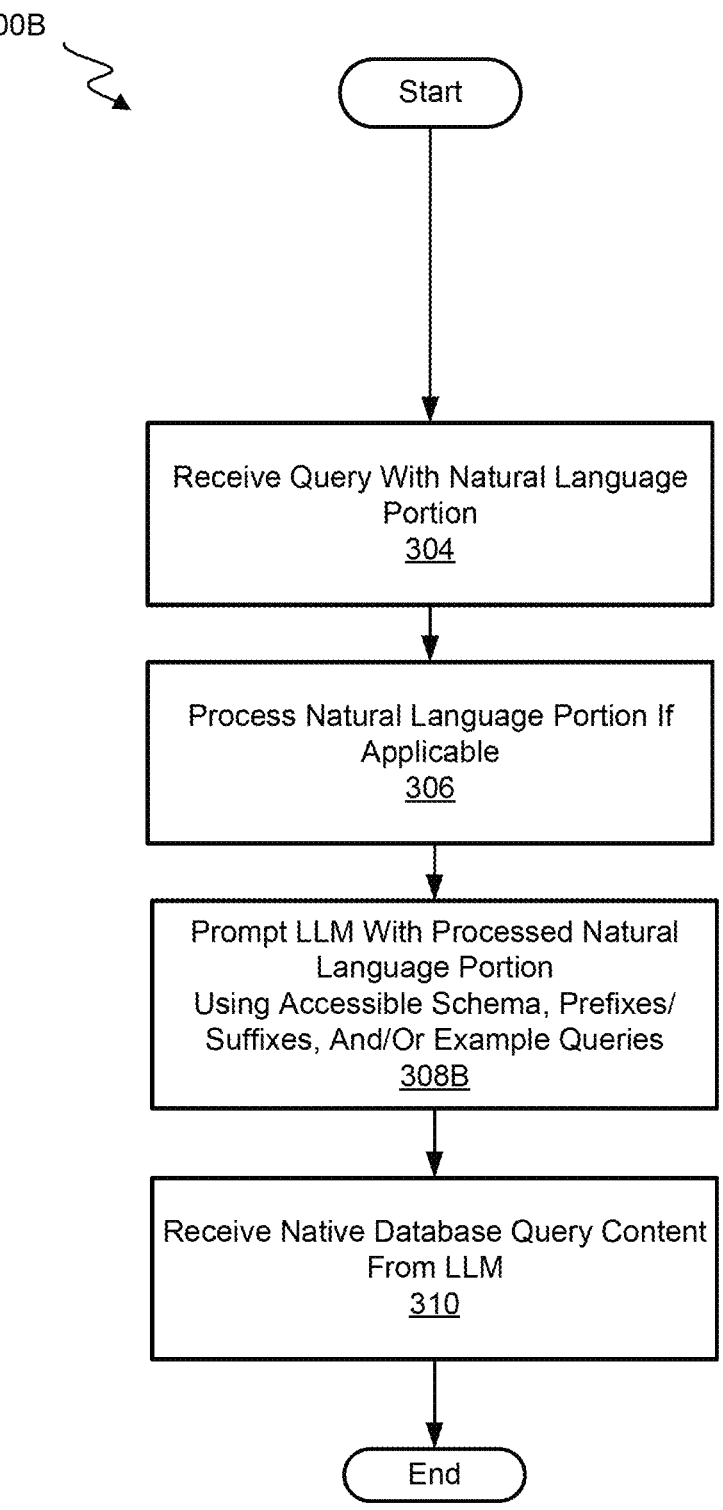
FIG. 3B illustrates a flow chart for handling a natural language portion of a query with a specialized prompt.

FIG. 3B illustrates a flow chart for handling a natural language portion of a query with a specialized prompt. In block 304, a query is received with a natural language portion, which is processed, if applicable, in block 306. Then, in block 308B, the database query processing service prompts an LLM with the processed natural language portion using accessible schema, prefixes and/or suffixes, and/or example queries in the prompt. Process 300B concludes when the database query processing service receives native database query content from the LLM in block 310.

The system may parse the natural language request for sensitive values that should not be exposed to the LLM. The system may parse the natural language request for a tuple of a regular expressions corresponding to sensitive values. For example, the system may parse the natural language request for any string of numbers in the regular form "XXX-XXX-XXXX" or a set of two consecutive words with capitalized first letters. These regular expressions correspond to person-ally identifiable information that should not be exposed to the LLM. When a sensitive value is detected, the value may be stored and replaced by a default value as a placeholder or mask to use in the prompt to the LLM. After receiving the particular SQL request from the LLM, the system searches for all uses of default values and replaces them with the original, stored values before executing the SQL request.

Metadata and Request Parameters for the Large Language Model

Beyond the additional text instructions for the large language model relating to the task at hand, the database query processing service may provide, via the large language model API, other metadata about the database object owner names (to disambiguate same-named objects), object names, column names, column aliases (to disambiguate same-named columns, e.g., table.column), time zone infor-mation, currency information, column datatypes, comments on tables and columns, database constraints, foreign key relationships, average or aggregate execution times and sizes or cardinality associated with processing different tables, and any training (sample) prompts and corresponding native database queries that have been provided by the user in the profile or otherwise received positive feedback based on past executions of database queries containing native language portions. For example, column names and column datatypes are provided in the first example OpenAI prompt and the second example Cohere prompt above.

The metadata provided to the particular large language model may identify data structure(s), which may include data structure(s) that get referenced when the particular large language model generates resulting native database query content. The data structure(s) may be those data structure(s) that are available to be referenced by the user submitting the initial query, such that the resulting native database query content references those data structure(s) in from clause, specifying where the data is being retrieved from, or the select clause or where clauses, which may specify columns to be returned or other conditions to be placed on those columns, respectively. The metadata provided may be used in the prompt itself or otherwise associated with prompting the particular large language model, such as being stored in association with an active session with the particular large language model.

In various embodiments, metadata may be passed in before or with a prompt to the large language model, including identities of existing database structures such as tables and/or columns, data types, column annotations, and other information from a data schema of the database being queried, a native query language to use, example native queries, such as SQL queries, constraints for generated native queries, default groupings, default schema assump-tions, etc. For example, the column annotations may be passed to the large language model in addition to the table and column names. The column annotations may provide information about what the columns mean so the large language model may better map the column name to natural language questions. For example, if the column is "state," the column annotations may say "column values are speci-fied in two-digit state codes for any of the 50 U.S. states." As another example, the column annotations may say that the region "North America" is stored as "North_America." As yet another example, the column annotations may say that a "true" value is stored as "1," and a "false" value is stored as "0." As yet another example, the column annota-tions may say that for a "status" column, the values may be "(0 means the project is in preliminary processes, 1 means in process, 2 means delayed, 3 means completed)." Column annotations may be manually provided and stored at any time, and/or may be automatically determined based on data types that are valid for and/or used for the column. For example, automatically generated comments may survey all unique values in a column. Automatically generated com-ments or other column annotations may be generated and/or shared with the large language model at the user's discre-tion, with options specified in the user's profile.

Column annotations may further include functions that should be applied for proper interpretation of a column's data. Some columns may be populated by an LOV, lookup table, or other function that must be called before interpret-ing the data of the column. In this case, the column anno-tation may include instructions to call the necessary function to interpret the column and optionally any necessary code or function call that should be used in the interpretation of the column.

In one embodiment, the data available for metadata to be included in or associated with the prompt depends on permissions of a user who submitted the initial query. For example, a first user with permission to access database structures "contacts, sales, and leads" may submit a first query that contains a natural language marker and natural language. As a result, a large language model may be prompted with metadata identifying a schema including "contacts, sales, and leads." In another example, a second user with permission to access database structures "HR, disputes, contacts, and sales" may submit a second query that contains a natural language marker and natural lan-guage. As a result, the large language model may be prompted with metadata identifying a schema including "HR, disputes, contacts, and sales" but not "leads." The large language model may produce results depending on the schema, which may differ depending on which database structures are accessible to the different users.

In one embodiment, the metadata is stored in association with a profile of a plurality of available profiles. Any given profile may be attached to a given request to execute one or more queries, or to a session where such requests may be submitted between a database client and the database query processing service. Other metadata may be stored in asso-ciation other profile(s) such that the metadata and the other metadata may identify different data structures from each other that are available for querying against depending on which profile is active for the request or session. Before receiving a database query for execution, the database query processing service may receive a request to set the profile associated with the metadata as an active profile in an active session of the database query processing service. After the profile is the active profile, zero or more other database queries may be received and executed with the profile remaining as the active profile, before a query is received with the natural language marker, triggering actual use of the metadata with a large language model based on the profile being the active profile.

For example, a configuration command may be provided to the database query processing service to configure a session or connection or a specific request within the session with metadata and preferences to use for natural language processing. The configuration of the session may also enable or disable natural language processing altogether, toggling whether natural language portions of queries are processed or not by the database query processing service.

As shown in the example below, the configuration command saves a profile 'movie_nl_processing' with attributes selecting the large language model to use, the credentials to use for authenticating with the large language model, the database structures, objects, tables, or columns listed in the schema, and optionally other variable parameters that may be re-used for different database queries that contain natural language portions. Although one profile is shown, different profiles may exist and be used and re-used in different scenarios. The set_profile command also shown below sets the active profile for the session.

```
DBMS_CLOUD_AL CREATE_PROFILE(
    profile name=>'movie_nl_processing',
    attributes=>
    '{"provider": "openai",
        "credential name": "OPENAI CRED",
        "object_list": [{"owner": "myschema",
            "name": "movie"},
            {"owner": "myapp"}]}'
);
DBMS_CLOUD_AI.SET_PROFILE('movie_nlprocess-
    ing');
```

In one example, a configuration command may be provided to the database query processing service in a session or connection with a client to select the particular large language model for use with the natural language of incoming queries on the session, or for given requests, from the client. In the example above, the "openai" large language model provider is chosen with named credentials. The model used may be, for example, gpt-3.5-turbo. Other example providers include, but are not limited to, Cohere, Azure AI, Google PaLM 2, etc. In various other examples, default credentials may be used by the database query processing service. In one embodiment, the credentials include user-specific credentials, such as a user-specific inner session identifier, that allow the large language model service to switch between supporting different users within the same large language model session using the same large language model connection credentials. In this embodiment, context from a given user may be retrieved using the user-specific inner session identifier before processing a natural language query for the given user.

The profile may be modified to set attributes of the profile that change the metadata, configuration, or settings for communicating with the large language model and/or passing metadata to the large language model. The attributes may be set using the SET_ATTRIBUTE command.

The credentials may be stored for accessing the particular large language model. For example, the following configuration command may be provided to the database query processing service in a session with a client to store credentials for the particular large language model for use with the natural language of incoming queries on the session from the client, and the credentials below may be referenced in the example above to establish a connection with the selected large language model provider. The shown credentials include an API key but could also include a username, password, bearer token, or other secret that is used for authenticating with the large language model.

```
DBMS_CLOUD.CREATE_CREDENTIAL(
    'OPENAI_CRED', 'OPENAI', '<api_key>'
);
```

In one embodiment, natural language processing may be initiated from within a database session even without a profile being set. In this embodiment, the database query processing service may use default settings to execute the query.

Security configuration information may be stored for the session that determines whether the session is allowed to execute natural language queries, and, if so, to what extent. Queries containing natural language may have an increased cost in terms of resources used (time, processing power, and money) as compared to native database queries, and users and sessions may be restricted from or empowered to take advantage of these capabilities. Privileges may also be managed on a user-by-user basis, a session-by-session basis, or for the database as a whole to allow external connections to certain large language model(s) for natural language processing, and to accept information provided by the large language model(s) for use in database query processing. The selected large language model(s) may be added to a whitelist for which connections are allowed, and prohibited large language model(s) may be added to a blacklist for which connections are disallowed. Permissions may be checked on execution of the database query containing the natural language marker and natural language, and/or upon activation of a profile specifying natural language query processing metadata and/or preferences.

In one embodiment, a database profile specifying one or more items of metadata and/or preferences with respect to natural language processing may be stored in association with a lightweight or non-persistent session that is loaded by a persistent session in preparation for executing a database query for a specific user or set of users, and another, different database profile specifying other, different items of metadata and/or preferences with respect to natural language processing may be stored in association with another lightweight session that may be loaded by the persistent session in preparation for executing another database query for different specific users or sets of users. In this manner, a client with the persistent session to the database query processing service may swap between lightweight or non-persistent sessions serving different users according to different natural language processing metadata and/or preferences, and the profile information for the non-persistent sessions may be saved and re-loaded when the non-persistent sessions become active in the persistent session. As used herein, a session in this scenario is "persistent" in the sense that the session remains active with the database query processing service even though other non-persistent session data gets loaded and unloaded from the persistent session as the persistent session gets used.

In the same or another embodiment, the database profile specifies one or more items of metadata and/or preferences with respect to natural language processing that may be stored in association with the persistent session. As the persistent session remains up, the database profile settings may remain active and used for queries in the persistent session. When the persistent session ends, the database profile may be saved and re-loaded the next time the persistent session is created between the client and the database query processing service.

In one embodiment, the database query processing service sends one or more items of metadata and/or preferences to the large language model(s) when a session is initiated. In the same or another embodiment, the database query processing service sends one or more items of metadata and/or preferences to the large language model(s) at the time the large language model(s) are prompted to process a natural language portion of a query. The metadata and/or preferences may be persistent at the large language model(s) between queries in the same session between the database query processing service and the large language model(s). In this manner, queries with the same settings may be processed efficiently without re-sending some items of metadata and/or preferences but merely relying on the large language model(s) to re-use the items of metadata and/or preferences if configured to do so.

Prompting one large language model for a natively valid replacement database query content may use different large language model instruction(s) than are used when prompting another large language model for a natively valid replacement database query, even if the initial query triggering the prompt is otherwise the same and the schema is otherwise the same. The prompts may be discovered during the training phase and may provide unique instructions that are helpful to steer individual large language models from observed results that stray from valid database queries that (a) do not address the natural language prompt, or (b) do not result in valid database query content.

In one embodiment, the database query processing service provides, to the particular large language model, one or more example or sample natively valid database queries that are not responsive to the received database query that has been requested to be processed by the database query processing service. The one or more sample natively valid database queries may provide context that is useful for the large language model to generate a natively valid database query that is responsive to the received database query that has been requested to be processed by the database query processing service. In other words, the database query processing service may use the one or more example natively valid database queries that are not responsive to the received query in order to prompt the large language model to generate a response that is responsive to the received query. The example natively valid database queries may be responsive to other past received database queries that are also provided to the particular large language model for guidance on how to generate a natively valid database query to replace natural language from the past received database queries. The past received database queries may reference database structures that are present in the schema, and the past received database queries may provide natural language that the large language model can determine maps to the referenced database structures.

In various embodiments, the large language model is configured to use a prompt history in the session to generate a natural language result. The natural language result may be based at least in part on information provided in one or more past prompts to the particular large language model, such that this context from past prompts helps refine and inform the large language model about what the natural language is requesting and/or how to generate queries compatible with the database environment involved. In one embodiment, the database query processing service prompts a large language model to consider a database session as one large language model conversation and to maintain a history of the past N prompts (e.g., the past 5, 10, or 15 prompts) and responses in the current database session for a specific action. In this embodiment, the natural language translation may be improved with contextual history of prior interactions with the large language model, via prior queries that contained natural language markers and natural language portions.

Selecting a Profile for the Large Language Model

When generating a query prompt for a large language model, a profile for engaging the large language model may be determined. The profile may dictate the particular large language model to be used and/or a particular set of data views, comprising the specific database structures used as the target of the query prompt. Selecting a profile with a specified large language model may improve accuracy of the resulting generated query as the large language model may be specified for the profile based on a determination that it is a better large language model to use for database queries relevant to the profile. Selecting a profile with a specified set of data views may improve the accuracy of the resulting generated query as providing the large language model with only the relevant data may result in fewer irrelevant data that should not be selected by the large language model as part of the generated query or may cause the large language model to hallucinate. The profile may be associated with a specific context or functional domain and include optimizations for generating query prompts for database queries of the specific context or functional domain. In the case that a profile is not determined for a database query, a default profile including a default large language model and a default set of data views may be pre-defined.

A received query including natural language may be categorized in a particular category based on a specific context or functional domain detected within the received query and, in particular, the natural language of the received query. The particular category determined for the received query may be of a plurality of categories that are pre-defined.

Referring back to FIG. 2, in block 206, the natural language request detected is categorized into one or more pre-defined categories. In block 208, a large language model and one or more database structures are selected for processing the request of the database query. In one embodiment, masking values are substituted for sensitive values of the request at block 210, so as to not expose those sensitive values to the large language model. In block 212, the process 200 generates a prompt to the selected large language model including the selected database structures of block 208, the prompt including a request to the large language model to generate native database query content. In block 214, the selected large language model is prompted with the prompt to generate native database query content such as a SQL request of a database. In block 216, the received native database query content is validated. If the native database query content is valid, the results may, in block 220, optionally be cached to assist in future requests and the process 200 continues on to block 222.

Referring back to FIG. 4, the natural language processing service 414 may include a storage of database structure metadata 424 and a storage of various profiles 426 for the large language models. When prompting the large language models 416-422, the natural language processing service may select a profile of the profiles 426, which may direct which large language model of the large language models 416-422 to use for generating the prompt response 428. The profiles 426 may also direct the large language model, via the prompt 412, to generate the prompt response 428 based on specific data views that describe database structures stored as database structure metadata 424.

The data views specified by a profile for the large language model may be included in the prompt to the large language model. The data view may be included in the prompt in a table format including each column name of the included columns of the data view. The data view may comprise metadata storing only the column names or metadata about the tables or data structures that are combined within the data view. The data views may themselves be stored as metadata for a database instance separate from the database instance used to execute the database query. However, the database instance used for deriving the data for the data views may be an instance of the same database as the database instance used to execute the database query. The database instance used for deriving the data for the data views may be limited to only the column names or to metadata of the database and exclude values within the data structures of the database, such that the values are not exposed to the large language model. Alternatively, the database instance used for deriving the data view may represent the data structures of the database as empty tables having the same column names or metadata as the original database structures.

In one embodiment, the database query processing service determines the particular category of the received query based on contextual terms detected in the received query and, in particular, natural language in the received query. The database query processing service may parse the received query, with each term being compared to a dictionary of terms associated with a plurality of categories. The parsing may be performed specifically for natural language detected in the received query. For example, a pre-defined plurality of categories may include financial, manufacturing, and human resources categories. The database query processing service parses the received database query and determines that the database query includes natural language that includes terms such as "invoices," "ledger," or "accounting." These detected terms correspond to the pre-defined financial category of the plurality of categories, therefore the financial category is selected and a corresponding profile is selected for determining the particular large language model to use, the selected set of data views to use, and any optimizations for queries of the financial category.

In an alternative embodiment, the particular category of the received query may be determined by a large language model. The database query processing service constructs a prompt to a large language model for determining a particular category for the received query. The prompt includes the received database query, along with the pre-defined plurality of categories and any associated data for understanding the pre-defined categories. The associated data for understanding the pre-defined categories may include a set of terms associated with each of the pre-defined categories of the plurality of categories. The prompt also includes a request instructing the large language model to determine the particular category from only the included pre-defined categories. Included below is an example prompt to a large language model for determining a category for a database query:

Example Categorization Prompt

"Which of the following domains does this question most closely apply to. Just return the domain name.

Question: Show me the employees reporting to John Doe ?

Domains: MANUFACTURING (Associated Terms: Shopfloor, Quality, Nonconformances, Components, Workorders, Costing, Supply Chain, Logistics, Production, Scrap), FINANCIALS (Associated Terms Invoices, General Ledger, Sub Ledger, Accounting, Set of Books, Payments, Cash Inflow/Outflow, Financial Reconciliation), HRMS (Associated Terms: Org Hierarchy, Salary, Employment, Reporting to, Supervisor, Performance Review, Attrition, Joining Date, Employee Location, Remote Worker, Contingent Worker)"

In yet another embodiment, the particular category of the received query may be determined by comparing vector embeddings of the text of the received query and the database structures of the database. A large language model may be used to create vector embeddings of the received query, in whole or in part. The vector embeddings of the received query may then be compared using a vector search or distance algorithm to determine the closest matches to a set of vector embeddings for database structures of the database. Vector embeddings may be created for each table, column, or other grouping of data that are contained within the database. The vector embeddings may be created from the data of the tables or columns, the column names for the table or columns, the annotations or other descriptions of the tables or columns, or any combination thereof. These vector embeddings may be created in advance of receiving the received query, so as to reduce the number of operations to fulfil the received query, or at the time of receiving the received query. If the vector embeddings for tables or columns of the database are created in advance, they may be updated with a new vector embedding each time a change is made to the table or column.

Vector embeddings may be generated for each table for a broader vector search, or for each column of data such that groupings of related columns may be determined, even if from different tables. The closest table(s) or set of columns may be determined by a variety of vector distance search methods. Once the closest table(s) or set of columns is determined, the closest table(s) or set of columns may be used as the particular data view and stored as a new profile for the large language model or a closest profile may be determined by comparing the closest table(s) or set of columns to the pre-determined data views of pre-determined profiles for the large language model.

A category may include multiple sub-categories distinguished by further detail within their broader category. For example, a manufacturing category may include sub-categories of manufacturing output or quality testing, and a Human Resource Management System (HRMS) category may include sub-categories of organization hierarchy or employee skillsets. When determining a particular category for the received query, a sub-category may also be determined for the received query.

After a category, and/or optionally a sub-category, is determined for a database query, a profile for the large language model may be determined from the category or sub-category. Each category or sub-category may define one or more profiles for the large language model. Each profile may define a large language model to use for generating a native database query and/or one or more data views to use in generating the native database query. Data views are combinations of possible data fields combined from one or more data structures. A category or sub-category may define one or more data views that includes all relevant data fields across data structures that may be queried for questions of the determined category or sub-category.

In one embodiment, a database query processing service may parse a received query for terms from a list of terms relating to a plurality of categories. Due to a number of detected terms exceeding a threshold number of matches for a specific category, the specific category is selected. The selected category defines a specific large language model to use in generating a native database query, but defines multiple data views. The database query processing service determines that the specific category includes a number of sub-categories, and prompts a default large language model to determine the sub-category by constructing a prompt including the received database query, the possible sub-categories, and related terms for each of the sub-categories. The default large language model determines a specific sub-category, and the specific sub-category defines a specific data view for use in generating the native database query.

In another embodiment, a database query processing service may determine a particular category for a received query based on a context of a user interface. A database query may be received within a session with a user device via a user interface. The user interface corresponds to a context of an organization based on the use cases for the user interface or the types of users intended to engage with the user interface. For example, a user interface may be of a human resources context as the user interface is intended to be used by human resource managers of an organization and includes other features or functionality that provides assistance specific to human resource managers. When receiving a database query from such a user interface, the database query processing service may determine the context of the user interface such as by comparing metadata of the received database query indicating the user interface used to submit the received database query and comparing with a stored list of user interface contexts. By determining that the user interface is of a human resource context, the database query processing service may determine that the received query is of an HRMS category.

In another embodiment, a database query processing service may determine a particular category for a received query based on a state of a user interface. The user interface by which the received query is received may contain a variety of modes, settings, or data entry objects that all contribute to defining a current state of the user interface. Details of the state of the user interface may be passed to the database query processing service and interpreted in determining the category for the received query. For example, a user interface may be a human resources user interface with multiple tabs for selecting functionalities relating to "employee hierarchy" or "employee contact information." In determining a category for the received query, the context of the user interface may be considered as a human resource user interface along with the current state of the user interface for which tab is currently selected. If the "employee contact information" tab is currently selected, the category may be determined to be a personal information category, having a different corresponding data view than if the "employee hierarchy" were selected.

The particular category or sub-category may be determined from a category or sub-category from a previous database query. In a session used by the user, the user may enter sequential database queries. For the first database query of the sequential database queries, a category or sub-category may be determined, such as by one of the above methods. For all database queries of the sequential database queries entered after the first database query, the particular category or sub-category of the future sequential database queries may be determined at least in part by a consideration of the category or sub-category of the first database query. For example, a first database query may be received from a user that is determined to be of an HRMS category by detection of relevant terms within the first database query, and may be determined to be of an organization hierarchy sub-category by further terms detected in the first database query. For a second database query, the database query processing service determines if the second database query is received in a same session with the user's device as the first database query and via a same user interface as the first database query. If the second database query is received in the same session with the user's device and via the same user interface, the system determines that the second database query is of the HRMS category, and determines which sub-category of the HRMS category the second database query corresponds to.

A category or sub-category may be associated with one or more profiles, each of which may define a particular large language model for use in generating a native database query. The associated particular large language model may be pre-defined by a user or it may be determined by automatic process. A user may pre-determine the selection of large language models for profiles based on knowledge of the different large language models. Alternatively, the large language model for a profile may be determined by automatic process, where the large language model associated with a profile is determined as a best large language model for generating queries of the category associated with the profile. The large language model may be automatically determined by submitting test query prompts known to be of the category associated with the profile and comparing the result to an expected result. The large language model may also be automatically determined by a process of feedback.

The particular large language models and particular data views associated with a profile for the large language model may be determined, at least in part, by a process of feedback. Feedback may be received on the particular large language model or particular data view associated with a profile such as input from a user or the results of a validation process. The results of feedback may be stored as a score to compare scores of different large language models or different data views for generating queries for database queries of a particular category. Feedback may be recorded on an ongoing basis such that the associated particular large language model or particular data views for a category may change over time.

For each native database query generated via a profile of a large language model, an audit log may be recorded. The audit log may include information about the received database query, the prompt sent to the large language model, and the resulting native database query. The audit log may also record feedback from a user such as a positive or negative rating of the response to their database query. For positive results recorded in the audit log, vector embeddings of the corresponding received database query may also be recorded in the audit log. When receiving future database queries, the audit log may be searched, based on the stored vector embeddings, to find a closest prior database query with a positive user feedback. The profile used for the new database query may then be determined based on the stored profile used for the closest prior database query with a positive response.

The feedback recorded, such as audit log records, may accumulate feedback from multiple uses of a profile for different database queries. The feedback received from a user may be quantifiable and may be recorded as a score for the profile used. For example, a user interface displaying the results of the database query may prompt the user to respond whether the results properly answered their query. A positive response may be recorded as a +1 to the score value for the profile used while a negative response may be recorded as a −1 to the score value used. Alternatively, the feedback received may include a response corresponding to a value The audit log records may differentiate previous database queries responses of the same profile by data view used so as to record feedback on the data views of a profile. For example, a profile may include a set of data views, each of which having been used previously for prior database queries. Upon receiving a threshold number of feedback from further database query responses that negatively respond to a data view of the set of data views, the data view may be disassociated from the set of data views and the profile or an indication may be recorded for the data view not to be used for future database queries of the profile.

The particular data view used in generating a query prompt may be one of a set of data views associated with a profile for the large language model. The particular data view may be a combination of multiple database structures or data elements from multiple database structures such as a combination of columns of data from different database structures. The particular data view may be determined by the selection of a profile by one of the above described methods. In the case that a profile includes multiple data views, the particular data view may be determined from the set of data views of the particular profile. The particular data view may be determined by a comparison of vector embeddings for the data views and vector embeddings for the received database query, with the particular data view's vector embeddings having the closest vector distance to the received database query's vector embeddings.

The particular data view may also be determined from the set of data views of the particular profile based on a combination of methods described above for determining the particular profile. For example, the particular profile may be determined based on a comparison of the vector embeddings for the received query and the profiles or based on a determination of the category for the received query by a large language model. The particular profile may have multiple data views, some of which are included as data views of other profiles. The particular data view of the multiple data views may be determined to be an overlapping data view of the set of data view for the particular profile and the set of data views for a profile used for a previous responded to database query that most closely resembles the received query.

A user may define a profile for the large language model, defining either the large language model or the data views to use for the profile. The user may construct a profile via selection of specific data structures to use as the data view or via selecting multiple data view to combine or use as the data view for a profile. An example set of code for defining a profile is included below:

```
DBMS_CLOUD_AL CREATE_PROFILE(
    PROFILE_NAME=>'MFG_PROFILE',
      ATTRIBUTES=>'{"provider": "openai",
        "credential_name": "OPENAI_CRED",
        "object list": [
      {"owner": "SAI", "name": "WIP_JOBS_ECC_V"},
        {"owner":    "SAI",    "name":    "QA_PLAN-
          S_ECC_V"},
      . . .
      ]}');
```

For any methods of selecting a profile for the large language model, a ranked list of profiles may be determined with the first profile being the determined best profile for the received query. The ranked list of profiles may be presented to the user to select the particular profiles for the large language model to use. Alternatively, the first profile of the ranked list of profiles may be used with the remaining profiles of the ranked list of profiles being used as alternative profiles in the case that other profiles ranked higher in the list did not get a proper response from the large language model, had their response from the large language model rejected by a validation process, or received a negative feedback from the user.

Multiple profiles may be selected and used to generate multiple prompts in sequence or in parallel to generate a plurality of generated queries. That is, a plurality of combinations of large language models and/or database structures may be used for processing a natural language request. In the case that multiple profiles are used, each with their own generated query, the plurality of generated queries may be compared to determine a best query of the plurality of queries. A best query of the plurality of queries may be determined as a most common query. For example, five profiles may be determined to be a set of best profiles for a database query. Each of the five profiles are used with their respective large language model to generate a set of queries. Two queries of the set of queries are determined to be identical and the remaining queries of the set of queries are each unique. In the example, the query of the two identical queries is determined to be the best query and is used for performing operations.

Alternatively, when using multiple profiles, a best query of the plurality of queries may be determined as a query sharing the greatest similarity to the other queries of the plurality of queries. A similarity between the plurality of queries may be determined by a vector distance of vector embeddings of the queries, such as a cosine distance, Euclidian distance, or Manhattan distance, or by a numerical representation of the character distance between the strings of text of the queries.

In yet another alternative, the plurality of queries of the multiple profiles may be evaluated by a large language model to determine a best query. Each of the queries may be included along with the database query in a prompt to a large language model with a command to determine a best query to fulfil the database query Receiving and Validating Generated Query Content Output Based at least in part on the prompting of the particular large language model, the database query processing service may receive particular database query content generated at least in part by the particular large language model. Upon receiving the generated database query content, the database query processing service could pass the database query content on for execution against the database without additional safety and security checks. Alternatively, in one embodiment, the database query processing service determines whether the particular database query content is natively valid for the database query language to retrieve data from one or more particular database structures that are referenced in the particular database query content.

Referring back to FIG. 4, the prompt response 428 received by the database query processing service 410 may be validated by a validation service 436. The results of the validation service 436 may determine if the prompt response 428 includes a valid database query 440. For each valid database query 440, data may be stored in the database query cache 438 about the valid database query 440 and the query

408 to which it corresponds. The database query cache 438 may be referenced by the profiles 426 for the large language model in determining the profile to use for a given prompt.

In one embodiment, resulting database query content from a large language model may be validated to determine whether the resulting database query content references database structures that exist and/or are accessible to the user in the database session where the query was submitted. The database query processing service may also validate the query based on whether the query is well-formed according to the query language(s) accepted by the database execution engine, whether the objects referenced in the query are within the scope of the submitting user's privileges, whether the values checked for the referenced objects are valid values for the referenced objects, whether the database operations requested are within the scope of the submitting user's privileges, whether the database operations result in finite non-imaginary results, or whether the resulting database query is more complex or has a higher cardinality than resource usage (return size or processing time) limits imposed on the user or session, etc.

In one example, the resulting database query content may check whether a "state" column value is equal to "California." If the state column value is restricted to two characters, the query will be invalidated as not possibly accomplishing the desired task. This invalidated query may be passed back to the large language model with comments on why the query was invalidated and a prompt for the large language model to correct the generated database query content. Then the corrected database query content may be re-validated. Alternatively, the database query processing service may return an error in response to the received query, indicating that the natural language was not successfully mapped to valid native database query content.

In one embodiment, validation may be performed by a query optimizer that transforms the native database query into operations that reference underlying database structures such that the operations can be executed by a query execution engine. The query optimizer may check that the query is well-formed according to the syntax of the query language, that the referenced structure(s) are accessible to the user, that the results can be retrieved and returned within given resource constraints, without error. In the same or another embodiment, the validation is performed by the query execution engine that uses the order of operations provided by the query optimizer and determines whether any errors are encountered. In the same or another embodiment, the validation is performed by a service layer in front of the query optimizer to ensure that high-level criteria are satisfied, such as referencing data structures that are available to the user and/or using known native query commands.

In some examples, the database query processing service may determine that the database query includes a hallucinated reference to a database object that is not present in the schema accessible to the submitting user. As a result, the database query processing service may request a new database query from the large language model that does not contain the hallucinated reference, and/or may provide a response to the user indicating that the natural language was initially not able to be processed to produce a valid database query. If the database query processing service reverts back to prompting a large language model to fix the database query, for example, with additional metadata identifying why the initial query was invalid, the next resulting query may be valid or invalid. This back-and-forth request-and-validation step may be performed as many times as system or user configurations allow, until limits have been reached or until a valid query is produced.

In one embodiment, even though a valid database query is requested from the large language model, the large language model may produce additional output natural language that is not part of the potentially valid database query. In this embodiment, the database query processing service may detect a beginning and ending of a valid portion of the returned database query and trim the output so the resulting database query to use for further processing, returning, and/or execution is only the portion of the resulting database query that is valid.

In an alternative embodiment, the validation may be performed by test-executing the database query against another database instance. The database instance used for test-executing may include at least some of the data values from the particular result that would be obtained by executing the database query against the primary database. The database instance used for test-executing may be an instance of a backup database for the primary database, containing at least some of the same data as the primary database.

Referring back to FIG. 1, in one embodiment, if the database query is not valid, as determined in block 118, the database query processing service may return an error to the user in block 134. The error may indicate the natural language detected, the native query produced, and/or the reason the native query produced is not valid for execution against the database. In another embodiment, if the database query is not valid, the error information may be provided to the large language model for correcting the invalid query in a new iteration of block 116, in which case another determination may be made on whether the resulting database query is valid in block 118. This process may be repeated or may be cut off after N attempts or T time. In yet another embodiment, as shown in FIG. 2, if the database query is not valid, as determined in block 216, the database query processing service may determine, in block 218, an alternative profile including an alternative large language model and/or an alternative data view and attempt to generate a new database query.

Appending Security Predicate

After receiving a response native database query from the large language model, the database query processing system appends a security predicate to the native database query to create a modified native database query to use for requesting the proper data for the user from the database. A security predicate is based on an access constraint associated with the user's current session in an application. The security predicate enforces the limitations the access constraint imposes on access to the database by modifying the native database query to only access data that comports with the access constraint's limitations.

The natural language request from the user is received from the user-authenticated client device in a session between an application and the user. The user's engagement with the application may be within a persistent session or a session initiated specifically for submitting the natural language request. The session may be defined by the user's access to the application via a set of credentials for access to the application or the database. When the user submits the natural language request to the application, the session of the application is associated with one or more database access constraints. The association with the access constraints may be based on the user's credentials used to access the application in the session, details of the session, actions by the user within the session, details of the application, or some combination thereof.

When the natural language request is received, the prompt to the large language model may be generated without respect to the database access constraints. That is, the prompt to the large language model may not necessarily include role-based access controls of the database or any limitations to access of data within the database. In this case, the native database query received from the large language model as a result of the prompt will not constrain the data accessed to those data that fit within the access constraints and the access constraints must still be represented in the native database query to enforce database access security. However, the database query processing service may constrain the user-authenticated client device based on one or more database access constraints that are not enforced in either the database query processing service's prompt to the large language model or in a database session between the database and the application or the database query processing service. In this way, information about the database structures accessed may be used in determining the profile used for the database query that may not be accessible if constrained by the database access constraints. The database query processing service's constraining of the user-authenticated client device may be in the form of a security token or credentials stored for the user-authenticated client device, or an indication that the user-authenticated client device is constrained by a database access constraint when receiving a native database query from the large language model.

To enforce the database access constraints, a security predicate is added to a command within the native database query. A command within the native database query represents at least one action of accessing a database structure, such as a SQL SELECT clause. Each command, therefore, must be limited by a relevant database access constraint to enforce proper database access security. The system parses the native database query to identify a command to access one or more particular database structures for which at least one database access constraint of the one or more database access constraints applies. The system may identify multiple commands, each corresponding to a database access constraint.

Referring back to FIG. 2, in block 222, the native database query content is parsed to identify one or more commands within it. For any identified command, in block 224, a security predicate is appended to the command to restrict the data accessed to comport with a data access constraint. In block 226, the query optimizer generates an execution plan for executing the query against one or more underlying database structures. In block 228, the execution engine executes the plan to, for example, retrieve data from the underlying database structures. Then, in block 230, a visualization is caused to be displayed on the user's device based on the results of the execution. After display of the visualization, the process 200 may optionally receive user feedback on the response to the database query at block 232.

Referring back to FIG. 4, the prompt response 428 received by the database query processing service 410 may be passed to a security service 430 for appending a security predicate to at least one command of the prompt response 428. The security service 430 may receive user interface metadata 432 describing the database client 404, the session 406, or any credentials for the user 402 to determine the security predicate to append to the at least one command of the prompt response 428 to generate the security database query 434. The security service 430 may transmit the secured database query 434 to the database query processing service 410, which may then be validated by the validation service 436 to create the valid database query 440.

The native database query may be parsed for commands by searching the text of the native database query for key words representing functions or commands in the native database language. For example, the system may parse a SQL request for any uses of a SELECT command. A command may be detected as all text between a detected native database query and an indication of the end of the command, such as an indication of a new line or a semicolon. Multiple commands may be detected, separated by an indication of the end of a first command before the key word of a second command.

After identifying a command within the native database query, the system creates a security predicate that enforces the database access constraint that applies for that command. To properly enforce the database access constraint in the native database query, the security predicate should be in an executable native database format. To append the security predicate to filter the results of the native database query to only those data that comport with the database access constraint, the security predicate may be a limiting clause such as a SQL WHERE clause. To generate an executable SQL WHERE clause, the proper filters of the data are first identified, then formatted into the SQL WHERE clause format. The security predicate may contain more than a single SQL WHERE clause, depending on the number of SQL commands and whether other constraints should be added to the SQL request.

The security predicate is determined based on the role(s) assigned to the user and the database structure(s) from which data is requested. The role(s) may be assigned to user(s) in a role assignment database structure that may be persistently stored in the database and/or persisted outside the database based on user sessions that are using or have used an application service. Each role referenced in the role assignment database structure may specify type(s) of access that are allowed for the corresponding role against which database structure(s). The predicate(s) may be persistently mapped, in predicate database structure(s) that may be stored in association with objects corresponding to the database structure(s) for which access has been requested. The predicate database structure(s) may be stored as metadata for the objects or separately from the objects and may be maintained within or outside the database by an application. The predicate(s) indicate which type(s) of access against which database structure(s) are used corresponding to the role(s) of the user to carry out the request, and the database structure(s) indicated in the predicates may then be used to further fill in security assignments. the predicate(s) may be used to retrieve a security assignment that restricts access to the database structure(s) beyond the role(s) assigned to the user. For example, the specified database structure(s) in the predicate(s) may belong to one or more object group(s), and security assignment(s) for any object group(s) including the specified database structures may be retrieved as applicable to carry out the request against the database.

The security assignment may apply to the user or a group of users to which the user belongs and may apply to one or more database structures involved in the data access request. The security assignment assigns, to security assignment field(s), security assignment value(s) corresponding to record(s) of the database structure(s) accessible to the user. The security assignment restricts access to database structure(s) by preventing access to other records that do not have the security assignment value(s) for the security assignment field(s). In one embodiment, a user has access to a record if the record matches any security assignment value for any security assignment field. The database structure(s) for which access is restricted may otherwise be accessible to the user under the user's role(s).

The database may receive a query requesting the security assignment(s), and the query may be the same data access query that is used to retrieve the data from the database to generate a result set for the request. In other words, the data access as received by the database may be missing the security assignment field(s) and value(s) but may reference the security assignment database structure. As part of executing the query, the security assignment field(s) and value(s) may be filled into the query and passed to the database execution engine. For example, the security assignment(s) may be used to insert or substitute conditions into predicate(s) of the data access query, such as in a where clause of the query. In this manner, the predicate(s) sent to the database may be dynamically filled in by the database with the security assignment field(s) and value(s) as part of or otherwise pursuant to executing the query to retrieve the data. The database may then use the approved access paths that were included in the predicates and the additional conditions from the security assignments to retrieve the accessible records from the corresponding database structures. For example, the query may select data from the one or more database structures where the one or more security assignment fields match the one or more security assignment values. By selecting only that data which matches the condition(s), the condition(s) in the query may serve to exclude records that do not match the conditions (i.e., where the security assignment field(s) do not match the security assignment value(s)).

As an example, a user John_Smith may submit a database query that requests data from an Invoice object. The system authenticates the user as John_Smith who has an ABC_PAY-ABLES database role. A user service returns a token to be used in carrying out the database query and authenticating with an application platform and/or database. The database query is determined to contain a natural language request for data processing, such as process of data associated with a particular object such as the Invoice object. The system requests from the user authorization service any predicates relevant to read request policies for the user on the Invoice object. The user authorization service discovers that the ABC_PAYABLES role provides read permissions on the Invoice object and verifies that John_Smith is assigned to the ABC_PAYABLES role. The user authorization service returns a predicate for use in retrieving security assignments based on the ABC_PAYABLES role. The security predicates received by the system are then converted into a native database query format and appended to the relevant command of the database query.

The security predicate may include a series of edits to the native database query to result in a modified native database query that will only request the data corresponding to the data access constraint. For example, the system may parse a SQL request and determine that the request contains one command: "SELECT column1, column2, column3 FROM data_table;" The data access constraint may prohibit the user's access to column3 but permit access to column1 and column2. The security predicate to edit this SQL request may include an edit of the SQL request to remove the reference to column3 such that the resulting modified SQL request is "SELECT column1, column2 FROM data_table;"

After creating the security predicate for a command in the native database query, the security predicate is appended to the command in the native database query to generate a modified native database query. The security predicate, if in a SQL executable format such as a SQL WHERE clause, may be added to the SQL request as part of the language of the SQL request at the proper location to associate the security predicate with the command for execution.

For example, a database access constraint may limit the user's viewing of data to only data within the database relating to certain organizations. The system identifies that the database access constraint relates to a column of the data labeled "organization_id" and that the organizations for which the user has access represent a limited scope of the items of data with specific values in the "organization_id" column. The system identifies the structure of the security predicate is to restrict the data to only data with the key-value pair of "organization_id" 123, 234, 45678, and 67890. The system then constructs this into the following SQL WHERE clause: "WHERE organization_id IN (123, 234, 45678, 67890)." This WHERE clause may be appended to the end of the command: "SELECT * FROM Customers WHERE organization_id IN (123, 234, 45678, 67890);"

The security predicate may further include edits to the native database query based on the usage context of the session with the application. For example, the application accessed by the user may be a financial application or the session with the user may be for a financial context such as a user selecting a financial view within the application. From either of these use cases the system may determine that the session of the application has a financial usage context. A usage context may then be converted into a limitation, filter, or other edit to append to the native database query in creating the modified native database query. In the example of a financial usage context, a SQL request may be modified with a WHERE clause limiting to only columns labeled with metadata to correspond to financial data.

Performing Operation(s) Using the Generated Content

In one embodiment, if the database query processing service has determined that the particular database query content from the large language model is natively valid for the database query language to retrieve data from the one or more particular database structures that are referenced in the particular database query content, the database query processing service may cause execution of an operation responsive to the received database query using the particular database query content. Referring to the example of FIG. 1, a responsive operation to perform may be determined in block 122, where a determination is made on whether to execute the plan and, if so, whether to explain a result of execution as determined in block 110, such that the result and/or an explanation of the result may be provided in response to the query in block 112. As another example, a determination may be made in block 122 on whether to explain the generated query content from the LLM in block 128 and, if so, to provide such an explanation in a response to the user in block 112. As yet another example, a determination may be made in block 122 on whether to return the generated query content form the LLM as part of the response in block 112, whether or not such generated query content is also executed. Any of the pathways away from block 122 may be combined together or performed at the exclusion of each other, depending on the preference specified in the received query.

For example, the initial database query may include a specific action requested to be performed on a result of the natural language processing of the marked portion of the initial query. Example operations include, but are not limited to, runsql, narrate, showsql, explainsql, and chat. Any zero or more of these or other operations may be configured as default operations that occur even if they are not specified in the initial query. The runsql operation may return a sql result set of a native query that was generated based on the natural language input from the initial query. The narrate operation may return a conversational result that is based on a sql result set of a native query that was generated based on the natural language input from the initial query. The showsql operation may return a native query that was generated from the natural language input from the initial query. The explainsql operation may return a native query that was generated from the natural language input from the initial query and/or a detailed explanation of the native query that was generated. The chat operation may return a standard natural language output from the natural language input from the initial query without the large language model(s) being prompted to convert the standard natural language output into a database query that is native to a database query language. Three example initial queries are shown below:

Query A: select ai what are our top selling movies?
Query B: select ai narrate what are our top selling movies?
Query C: select ai chat what are the top movies?

In Query A, the default operation may occur since no other operation is specified. For example, if the default operation is runsql, the database query processing service may return the following example result of an executed query based on the natural language:

| Query A Result | |
| --- | --- |
| Movie Title | Total Sales |
| Aladdin | 82426.71 |
| Aquaman | 78091.19 |
| Captain Marvel | 76146.21 |
| The Lion King | 66606.75 |
| Spider-Man: Far From Home | 66516.26 |

In Query B, the operation specified is narrate. Accordingly, instead of returning the result above, the database query processing service may input the result above into a large language model to convert the result into a natural language output, as shown below.

Query B Result

"Here is a breakdown of total sales for different movies:
Aladdin: $82,426.71
Aquaman: $78,091.19
Captain Marvel: $77,146.21
The Lion King: $66,606.75
Spider-Man: Far From Home: $66,516.26
These figures likely represent the box office sales or revenue generated by each respective movie. It's a straightforward representation of the financial success of these films in terms of box office performance."

In Query C, the operation specified is chat. Accordingly, instead of returning a database query content that depends on data stored in a database, the large language model is being asked to return natural language content based on the large language model's knowledge from the world. The database query processing service may refrain from sending metadata and preferences associated with producing a native database query response when the chat operation is carried out. In one embodiment, the database query processing service uses a large language model session with no metadata or preferences specified. In another embodiment, the database query processing service uses a large language model session with chat preferences specified that are different than native query response preferences. Here is an example output in response to Query C using the chat operation:

Here are some widely acclaimed and popular films across different genres:

Drama: 'The Shawshank Redemption'
Pros: Gripping storyline, well-developed characters.
Cons: Some may find it emotionally intense.
Science Fiction: 'Blade Runner 2049'
Pros: Visually stunning, thought-provoking themes.
Cons: Pacing might be slow for some viewers.
Action/Adventure: 'Mad Max: Fury Road'
Pros: Intense action sequences, unique post-apocalyptic setting.
Cons: Limited character development.
Comedy: 'The Grand Budapest Hotel'
Pros: Quirky humor, visually engaging.
Cons: Humor style may not suit everyone.
Animated: 'Toy Story 3'
Pros: Heartwarming story, impressive animation.
Cons: Some might find it emotionally intense.

The operations responsive to the database query may include the display of a visualization of data retrieved from executing a database query. The visualizations may be caused to be displayed on the user's device on the user interface in a session between the user's device and the data query processing service. The visualizations may be directed by the data views selected for use in prompting the large language model for generating the database query. Each pre-determined data view may include one or more pre-determined visualization templates based on the data included in the data view. When receiving a response of the database query, a visualization may be determined from the one or more pre-determined visualization templates based on which data of the data view was accessed by the database query.

The visualization may also be determined, in part, by a detected request within the natural language request for a specific visualization. For example, the natural language request may ask for a "bar graph" of specific data. When parsing the natural language request, the term "bar graph" is detected to correspond to a pre-defined visualization template of the data view and a marker is stored to use the pre-defined visualization template after receiving the resulting data from the database query. After receiving the resulting data from the database, the marker may be checked and a visualization is caused to be displayed based on the pre-defined visualization template.

Returning Generated Non-Query Content

The above results show non-query content returned as a result of processing natural language from a query using the chat operation. The results may also be stored in the database directly and later queried without use of the large language model. In the case of chat input, the client may choose to persist the result in a database structure for comparison with other data stored in the database structures. In this way, clients may compare data from their private database structures with data from the real world and/or make adjustments to their processes to account for the real-world data added from the chat or other natural language result functionality in database queries.

Non-query content may be requested and returned by natural language in some sub-queries, while query content may be requested and returned by natural language in other sub-queries, and/or query results may be requested and returned by native query commands in other sub-queries, any of which may be submitted together in a single request for query execution to the database query processing service. Using Generated Query Content for Query Execution In one embodiment, as shown in block 108 of FIG. 1, the query content generated by a large language model may be executed against a database, for example, after an execution plan is generated in block 106. Executing the query may cause the execution engine to retrieve particular data from the one or more particular database structures, and including the particular data in a result set to be included in a response to the received database query.

In one embodiment, a query optimizer generates an execution plan and sends the execution plan to a database execution engine prior to execution against underlying database structures. The execution plan may take a logically formulated query in native database query language and select which database structures to access to compute the logically formulated query, as well as what order to access those structures. For example, a query may be executable against a larger database table or a smaller index of the larger database table, each pathway producing semantically equivalent results. Results are semantically equivalent if they equally satisfy the less precise constraints of the logically formulated query, even if they are not precisely the same. In many scenarios, the query optimizer may choose to execute the query against the smaller index to reduce the amount of data processed. However, in some scenarios, the query optimizer may choose to execute the query against the larger database table if much of the information from the larger database table is needed to complete query execution. If the initial query does not specify an order for results, results may be generated and provided in a response in different orders depending on which order is predicted to be most efficient to gather from the underlying database structures.

In one embodiment, optimizing the query content includes re-ordering operations while preserving semantic equivalence of the result. The re-ordering may be done to promote more efficient processing and handling or processing of potentially fewer rows ("lower cardinality") during execution. For example, a natural language portion of an initial query may ask a question that requires information to be joined from three different tables of different sizes. The large language model may construct a query that has little knowledge of the table sizes and optimal join order. The time and resources consumed by the query may depend on the join order, and the optimizer can determine the best join order based on the sizes of the tables so that the large tables are filtered down to a small number of rows before further processing and the smaller tables may be handled first without a similar benefit of filtering due to the join operation. Without using the optimizer and knowledge of execution times, table sizes, and semantically equivalent rewrite operations, the large language model may produce a suboptimal query that gets transformed by the optimizer using this additional information prior to execution.

Providing Results of Query Execution

Referring back to FIG. 1, results may be provided in a response to the database user in block 112. The results may include generated query content, an explanation of generated query content, results from execution of generated query content, an explanation of results from execution of query content, results from a received native database query, an explanation of results from a received native database query, and/or any other output generated from the large language model such as conversational output. The results or a portion thereof may be incorporated by an application into a visualization that allows the results to be analyzed, sliced, drilled into, or otherwise graphically manipulated. The results may be provided in a message back to the user or client who submitted the initial query, and the message may be transmitted in a database session or some other connection between the user or client and the database query processing service.

Generating Results Prompt for Large Language Model, and Providing Generated Results Content In one embodiment, the database query processing service causes execution of the generated database query content to retrieve particular data from one or more particular database structures in the database and further prompts a large language model to generate a natural language result explaining the particular data retrieved. The natural language result explaining the particular data retrieved is generated in example block 126 of FIG. 1, and may be provided as part of a natural language response to the query in example block 112 of FIG. 1.

In one embodiment, the database query processing service receives the initial database query from a database user (e.g., an application interacting with the database or a human user) containing natural language and prompts, in an initial prompt with included metadata, a large language model to generate native database query content. The database query processing service receives native database query content from the large language model, validates that the native database query content accesses only those database structures that the database user is allowed to access and validates that the database query content is well-formed syntactically, and, if so, executes the database query content to retrieve data from one or more referenced database structures. If non-null data is retrieved, the database query content results may then be passed back as a second prompt into a large language model, which may be the same or a different large language model as used for the initial prompt, with same or different metadata as the initial prompt. The second prompt may ask the large language model to explain the database query content results in the natural language rather than returning native database query content. Whether or not session history is enabled with the large language model, the second prompt may further inform the large language model in the prompt that the initial prompt was previously provided and that the database query content results were determined to be a response to the initial prompt, as part of asking the large language model to explain the database query content results. The database query content results may be passed into the large language model using the second prompt to generate a natural language explanation of the results row-by-row, as a whole, or in other defined sections. The natural language result explaining the database query content results may be returned to the database user in response to the initial database query. In one example, an application displays the natural language explanation of the results in a user interface concurrently with a display of a visualization based on one or more data values from the results.

In one embodiment, the database query processing service automatically determines whether to ask for row-by-row results, results as a whole, or other descriptions of the results based on the results generated by execution of the database query against the database structures. For example, a summary of the results as a whole may be requested for a large result with hundreds of rows; a row-by-row analysis explaining the meaning of each data value in each column for each row of data may be requested for a result with a medium result with several rows; and an in-depth analysis may be requested for a small result with only one or two values, to provide a richer meaning to the values themselves. In another embodiment, a combination of explanations may be requested, such as a summary followed by a row-by-row analysis. These settings may be adjusted in the user's profile based on what types of explanations the user prefers for data sets with different sizes and characteristics.

Caching Query Content

In various embodiments, database query content may be generated by large language models and cached in association with information about the initial natural language that caused generation of the database query content. The cached database query content may then be re-used when similar natural language is detected in the future. Referring to FIG. 1, a determination is made in block 114 on whether the natural language in the received query matches a past natural language pattern. If so, process 100 proceeds to block 130, where a query mapping or plan is retrieved for the past natural language pattern. Then, in block 132, variables may be substituted into placeholders for the associated query, if the matched natural language pattern and corresponding database query content have been stored with placeholders. Then, query execution may proceed in block 108 if a query execution plan was also cached or block 106 if the query execution plan is not yet available.

In one embodiment, the database query processing service stores the particular database query content in association with a first natural language text. The database query processing service may then receive another database query that includes the natural language marker and a second natural language text. The database query processing service then determines whether the second natural language text is semantically equivalent to the first natural language text. Based at least in part on determining that the second natural language text is semantically equivalent to the first natural language text, the database query processing service may cause execution of an operation, such as execution of the particular database query content to retrieve data from one or more particular database structures without prompting a large language model for natively valid replacement database query content between receiving the other database query and execution of the particular database query content.

As new queries are received, the new queries may be matched to one or more existing templates based on natural language portions that have already been converted into native database queries. If a new query matches an existing template, instead of prompting the large language model for a new answer, the database query processing service may retrieve a native database query corresponding to the natural language portion with placeholders.

In one embodiment, the database query processing service stores a first query template of the particular database query content in association with a first text template of the first natural language text. The first text template may include one or more first placeholders for one or more variables, and the first query template may include one or more second placeholders for one or more corresponding variables. The database query processing service may then receive another database query that includes the natural language marker and a second natural language text. The database query processing service then determines whether the second natural language text matches the first text template when one or more particular variables of the second natural language text are replaced with the one or more first placeholders. Upon finding a match, the database query processing service may substitute the one or more second placeholders in the first query template with the one or more particular variables of the second natural language text to generate the second particular query content. The database query processing service may then cause execution of an operation, such as execution of the second particular database query content to retrieve data from one or more particular database structures without prompting a large language model for natively valid replacement database query content between receiving the other database query and execution of the second particular database query content.

In one embodiment, the natural language statement is canonicalized, normalized, or otherwise simplified prior to caching. For example, extra whitespaces may be removed, and language from a list of stop words or stop phrases that is known to not impact results may be removed, such as "please," "would you," "my," and "our". If none of these unnecessary complexities are present, the simplified natural language statement may be the same as the initial natural language statement. The database query processing service may cache the simplified natural language statement for matching against future simplified versions of received natural language statements.

In one embodiment, the simplified natural language statement is a template that further removes one or more variables from the initial natural language statement and/or the generated database query content mapped to the initial natural language statement. For example, numerical variables may be detected to not impact the syntax of the generated native database query content, and placeholders may be substituted for these numerical variables in both the initial natural language statement and the generated database query content, for caching purposes. The placeholders may be associated with a valid replacement data type, such as a number, variable characters, or Boolean value. One additional benefit of placeholders is that they often consume less space in storage than the actual value being replaced. An example placeholder that may be used to replace values and refer to the underlying value at a location in memory is a bind variable.

For example, the following initial query and resulting native database query content from the initial query may be cached in the cached form shown below, which includes placeholders [NUM1] and [NUM2] for two numbers that occur in the initial query. The cached natural language portion further excludes extra spaces and the keyword "my," which is irrelevant additional text that may appear in a list of stop words to remove.

Natural Language Portion of Initial Query find my employees in sales division 3 more than 10 years Resulting Native Database Query Content from Initial Query select * from emp where division=3 and tenure >10

Cached Natural Language Portion of Initial Query find employees in sales division [NUM1] more than [NUM2] years Cached Resulting Native Database Query Content from Initial Query select * from emp where division=[NUM1] and tenure >[NUM2]

After the initial query is cached, a subsequent query may be received as shown below. The subsequent query may be processed by the database query processing service to remove any stop words, such as "our," and to map any potential numerical or other variables to placeholders for matching purposes, such as "5" and "4" in the example. Although the numbers are removed, the database query processing service stores the variables NUM1=5 and NUM2=4 in the background during the matching process.

For example, the placeholders may be bind variables that refer to the memory address where the actual value is retained. The processed version of the natural language portion of the subsequent query may be matched to the cached natural language portion of the initial query. As a result, instead of prompting a large language model or instead of waiting for the large language model to produce a result (if the large language model was already prompted), the cached resulting native database query content from the initial query is used to determine the resulting native database query content from the subsequent query, as shown below. The numerical value assigned to the NUM1 placeholder from the processed version of the natural language portion of the subsequent query and the numerical value assigned to the NUM2 placeholder from the processed version of the natural language portion of the subsequent query are substituted for the placeholders in the cached resulting native database query content from the initial query to produce the resulting native database query content from the subsequent query below.

Natural Language Portion of Subsequent Query find our employees in sales division 5 more than 4 years Processed Version of Natural Language Portion of Subsequent Query find employees in sales division [NUM1] more than [NUM2] years Resulting Native Database Query Content from Subsequent Query select * from emp where division=5 and tenure >4

Results from natural language processing by the large language model may be cached for any of the operations requested, whether chat operations, explaining query functionality, describing a result set, or generating a native database query based on natural language input. Results from using natural language to generate a native database query may be cached and re-used even if the underlying operations performed on the generated native database query (return the generated query to the user, execute the generated query, explain the generated query, or execute the generated query and explain the result) are different. After these results have been produced once and cached by the database query processing service, any of these results may be retrieved when similar prompts are received by the database query processing service, without requiring a back-and-forth round trip with the large language model.

In one embodiment, a cache of results may be enabled or disabled for a given query, or in the preferences for a session. For example, if natural language in a query is asking for "a different list of top movies," the cache may be disabled for the natural language processing so the result is different each time rather than being different one time and the same each subsequent time. The cache may be automatically disabled for queries that are prompting the large language model for "different" or "unique" results. In another example, the cache may be disabled or enabled by default for the session via a profile saved for the session. In yet another example, the cache may be enabled or disabled for a given query by passing a parameter into the query. For example, "select ai use_cache=false what is a different list of top movies?" may provide a different list each time with no caching, based on the passed in parameter readable by the database query processing service.

In one embodiment, the data available for metadata to be included in or associated with the prompt depends on permissions of a user who submitted the initial query, and similarly the data to be re-used in the cache depends on whether the data is cached in association with the same metadata. For example, a first user with permission to access database structures "contacts, sales, and leads" may submit a first query, and a second user with permission to access database structures "HR, disputes, contacts, and sales" may submit a second query. Because the first and second queries involve different data structures, in one embodiment, the results of the first query are not cached and re-used to produce results of the second query. In another embodiment, if the first query asked a question that produced a native database query that referenced only "contacts" and "sales" objects, and not "HR", "disputes," or "leads" objects, then the first query may be cached and re-used for the second query because the information used for the query includes data structures that are overlapping between the two users and does not include any data structures that are not overlapping between the two users.

In one embodiment, the cached mappings between natural language portions and resulting database query content may include a minimum required schema associated with each of the mappings. If the schema is the same between different tenants, customers, or users, cached mappings between natural language portions and resulting database query content may be used between tenants. For example, a first query submitted by a first tenant, customer, or user with a particular schema including a particular one or more database objects of a first database may be used to generate a cached natural language portion that was used to generate native database query content that references the particular one or more database objects of the first database. A second query may be submitted by a second tenant, customer, or user with the same particular schema referencing the particular one or more database objects but such that exist in a second database of the second tenant rather than the first database of the first tenant. Although the particular one or more database objects have the same name, they exist in a different database and likely contain different data. The database query processing service may detect that natural language of the second query matches the cached natural language portion from the first query. The database query processing service may then use the generated native database query content from the first query to execute the generated native database query content against the second database and retrieve a result specific to the second database and the second tenant using the generated native database query that was cached for the first tenant. This avoids a round-trip with the large language model and has the same result if the referenced portions of the schema, or referenced database objects, otherwise have the same name and structure between the tenants, customers, or users.

If the database structures are different for different tenants, customers, or users, rather than re-using the cached version of the previously generated database query content, the database query processing service may newly generate database query content to determine a new generated database query that is specific to the different schemas of the different tenants, customers, or users.

In one embodiment, query execution plans are generated, including query optimization, for a query template before bind variables are replaced with values. In this embodiment, query execution plans that result from a query optimization and plan generation process may be re-used between templates that have the same bind variables, resulting in improved efficiency. Once the plan is generated or retrieved, values for the bind variables may be substituted in the plan for execution.

Example Application Design

The database query processing system described above may be implemented via a variety of user interfaces, database systems, or software languages. The following description within this section describes an example application design for implementing some embodiments.

The receiving of the user's database query is performed in a front-end application. The user engages with the front-end application in a session with the user's device. The user's device, submits to the database query processing system a request to create a session for the front-end application. The database query processing system establishes a session of the application with the user's device, optionally with performing a validation step to validate the user's device for the application session based on credentials of the user. The user's device then displays a user interface connected to the application session that is managed by the database query processing system. The user enters, via the use interface, the database query which is then transmitted within the application session to the database query processing system.

The user interface may contain a field for text entry in which the user can enter natural language text forming a database query to be interpreted by the database query processing system. By only including only a single text entry field in the user interface, the user interface may be easy to user and have a low performance cost on the user's device.

The implementation of a front-end service for handling database queries may be configured within the same server as the database. Implementing a front-end service on the same server as the database may prevent unwanted access restrictions between the front-end service and the database when handling database queries. Alternatively, a front-end service may be implemented in a separate server as the database, with a secure database link between the two servers.

An example user interface may be an Oracle APEX front-end application. Oracle APEX resides within Oracle Database in its own schema and access by users is entirely browser-based via a Web listener communicating with the Oracle Database.

In some embodiments, an application may sit in the middle of the user's user interface and the database level management. The mid-level application may handle both database queries and database management communications from the user to the database. Alternatively, database queries may be handled by a separate application from the application that handles database management communications such that each mid-level application may be managed independently.

In the example of an Oracle APEX front-end application, the interpretation of http-based requests from the user's device are converted to database API calls via Oracle REST Data Services before they are passed to the database level. The APEX user interface accepts English questions, which are then submitted to a natural language query service through REST API to convert to SQL queries, which are submitted to a database via the REST API.

In order to properly construct a native database query that will access the proper data, the natural language query service must access some information relating to the database. The natural language query service may be implemented with a separate database instance such as an autonomous database that contains some information from or about the database. The autonomous database may include selected data views of the database including denormalized columns that provide meaningful information without requiring complex join conditions. The data view of the autonomous database may also contain identity columns as well as associated security policies so as to implement record-level security.

New database structures may be created in the original database to give another layer of security to access requests by database queries either for embodiments utilizing a separate database instance for natural language processing or for embodiments using the same database instance for both natural language processing and database query execution. The new database structures may act as copies or synonyms of data views within the database. In this embodiment, database queries are queried against the synonyms instead of the original database data views. When selecting a database synonym, a virtual private database is created to implement the proper database access restrictions in the security predicate. The virtual private database calls a corresponding data security function for the synonym's base view to obtain the proper access restrictions which are then converted into an executable security predicate.

Computer System Architecture

Figure 6:
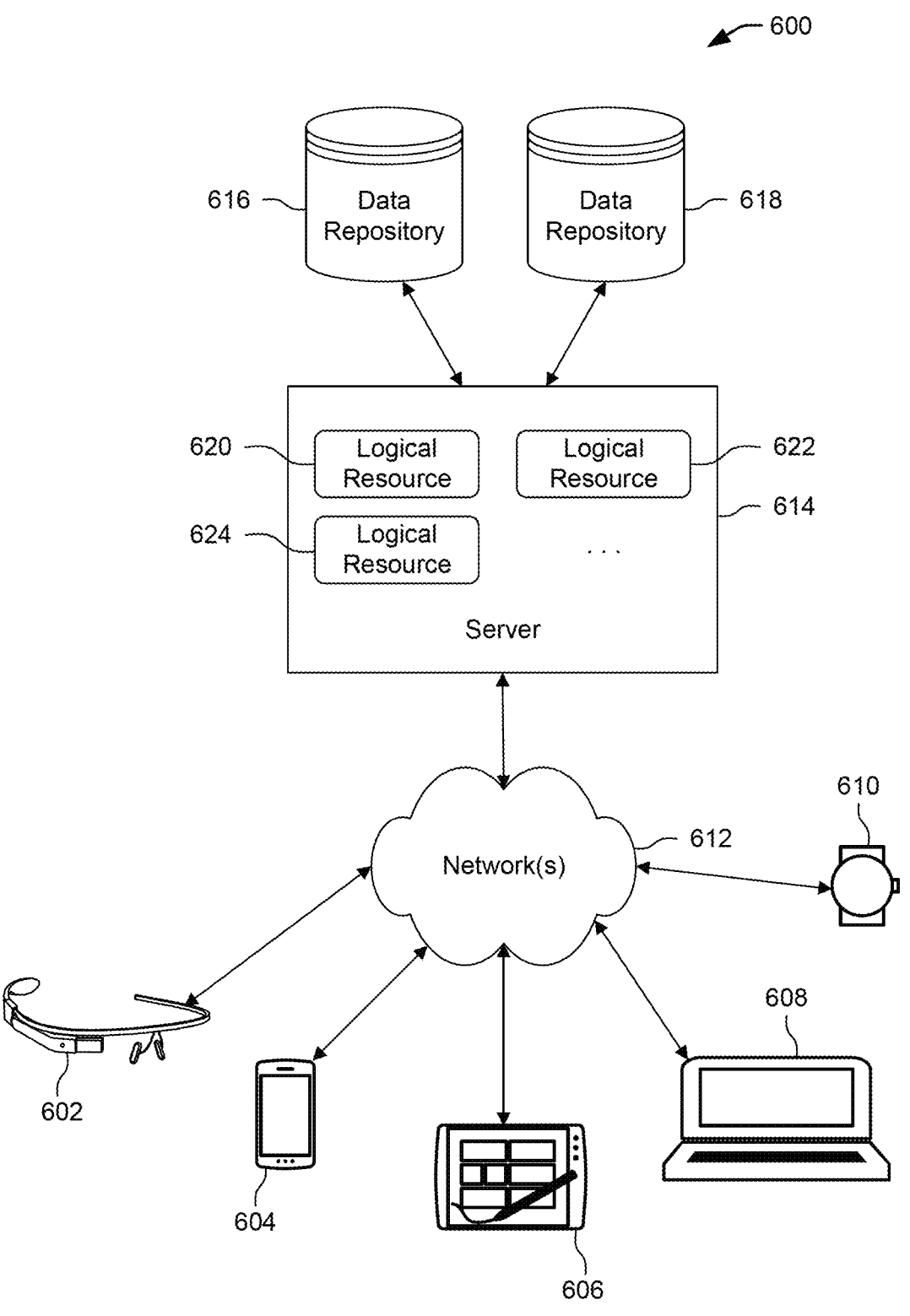
FIG. 6 depicts a simplified diagram of a distributed system for implementing certain aspects.

FIG. 6 depicts a simplified diagram of a distributed system 600 for implementing an embodiment. In the illustrated embodiment, distributed system 600 includes one or more client computing devices 602, 604, 606, 608, and/or 610 coupled to a server 614 via one or more communication networks 612. Clients computing devices 602, 604, 606, 608, and/or 610 may be configured to execute one or more applications.

In various aspects, server 614 may be adapted to run one or more services or software applications that enable techniques for database query processing.

In certain aspects, server 614 may also provide other services or software applications that can include non-virtual and virtual environments. In some aspects, these services may be offered as web-based or cloud services, such as under a Software as a Service (SaaS) model to the users of client computing devices 602, 604, 606, 608, and/or 610. Users operating client computing devices 602, 604, 606, 608, and/or 610 may in turn utilize one or more client applications to interact with server 614 to utilize the services provided by these components.

In the configuration depicted in FIG. 6, server 614 may include one or more components 620, 622 and 624 that implement the functions performed by server 614. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, 608, and/or 610 for techniques for database query processing in accordance with the teachings of this disclosure. A client device may provide an interface that enables a user of the client device to interact with the client device. The client device may also output information to the user via this interface. Although FIG. 6 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS©). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 612 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 612 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 614 may be composed of one or more general purpose computers, specialized server computers (including, by way of example, PC (personal computer) servers, UNIX® servers, LINUX® servers, mid-range servers, mainframe computers, rack-mounted servers, etc.), server farms, server clusters, a Real Application Cluster (RAC), database servers, or any other appropriate arrangement and/or combination. Server 614 can include one or more virtual machines running virtual operating systems, or other computing architectures involving virtualization such as one or more flexible pools of logical storage devices that can be virtualized to maintain virtual storage devices for the server. In various aspects, server 614 may be adapted to run one or more services or software applications that provide the functionality described in the foregoing disclosure.

The computing systems in server 614 may run one or more operating systems including any of those discussed above, as well as any commercially available server operating system. Server 614 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 614 may include one or more applications to analyze and consolidate data feeds and/or event updates received from users of client computing devices 602, 604, 606, 608, and/or 610. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 614 may also include one or more applications to display the data feeds and/or real-time events via one or more display devices of client computing devices 602, 604, 606, 608, and/or 610.

Distributed system 600 may also include one or more data repositories 616, 618. These data repositories may be used to store data and other information in certain aspects. For example, one or more of the data repositories 616, 618 may be used to store information for techniques for database query processing. Data repositories 616, 618 may reside in a variety of locations. For example, a data repository used by server 614 may be local to server 614 or may be remote from server 614 and in communication with server 614 via a network-based or dedicated connection. Data repositories 616, 618 may be of different types. In certain aspects, a data repository used by server 614 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 616, 618 may also be used by applications to store application data. The data repositories used by applications may be of different types such as, for example, a key-value store repository, an object store repository, or a general storage repository supported by a file system.

In one embodiment, server 614 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 7:
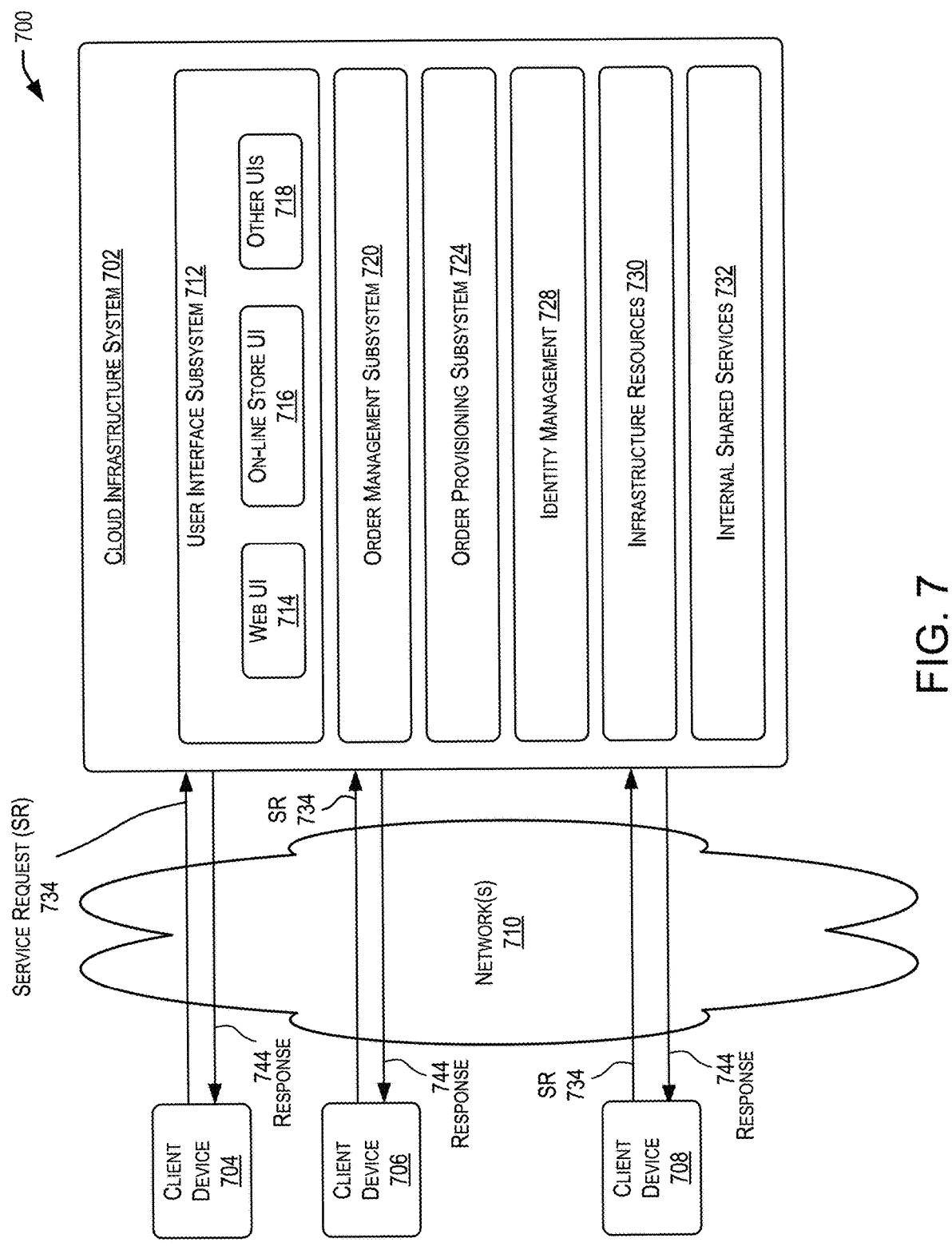
FIG. 7 is a simplified block diagram of one or more components of a system environment by which services provided by one or more components of an embodiment system may be offered as cloud services, in accordance with certain aspects.

In certain aspects, the techniques for database query processing. FIG. 7 is a simplified block diagram of a cloud-based system environment in which database query processing, in accordance with certain aspects. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 614. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other aspects, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative aspects.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 710 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 702 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 702 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 702. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 702. Cloud infrastructure system 702 then performs processing to provide the services requested in the tenant's subscription order. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public tenant, where the tenant can be an individual or an enterprise. In certain other aspects, under a private cloud model, cloud infrastructure system 702 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702.

In some aspects, the processing performed by cloud infrastructure system 702 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for determining the intent of an utterance. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain aspects, to facilitate efficient provisioning of these resources for supporting the various cloud services provided by cloud infrastructure system 702 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a tenant may, using a client device, request (service request 734) one or more services provided by cloud infrastructure system 702 using one or more of interfaces 714, 716, and 718. For example, a tenant may access the online store, browse cloud services offered by cloud infrastructure system 702, and place a subscription order for one or more services offered by cloud infrastructure system 702 that the tenant wishes to subscribe to. The service request may include information identifying the tenant and one or more services that the tenant desires to subscribe to.

In certain aspects, such as the embodiment depicted in FIG. 7, cloud infrastructure system 702 may comprise an order management subsystem (OMS) 720 that is configured to process the new order. As part of this processing, OMS 720 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 702 may send a response or notification 744 to the requesting tenant to indicate when the requested service is now ready for use. In some instances, information (e.g., a link) may be sent to the tenant that enables the tenant to start using and availing the benefits of the requested services.

Cloud infrastructure system 702 may provide services to multiple tenants. For each tenant, cloud infrastructure system 702 is responsible for managing information related to one or more subscription orders received from the tenant, maintaining tenant data related to the orders, and providing the requested services to the tenant or clients of the tenant. Cloud infrastructure system 702 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 702 may provide services to multiple tenants in parallel. Cloud infrastructure system 702 may store information for these tenants, including possibly proprietary information. In certain aspects, cloud infrastructure system 702 comprises an identity management subsystem (IMS) 728 that is configured to manage tenant's information and provide the separation of the managed information such that information related to one tenant is not accessible by another tenant. IMS 728 may be configured to provide various security-related services such as identity services, such as information access management, authentication and authorization services, services for managing tenant identities and roles and related capabilities, and the like.

Figure 8:
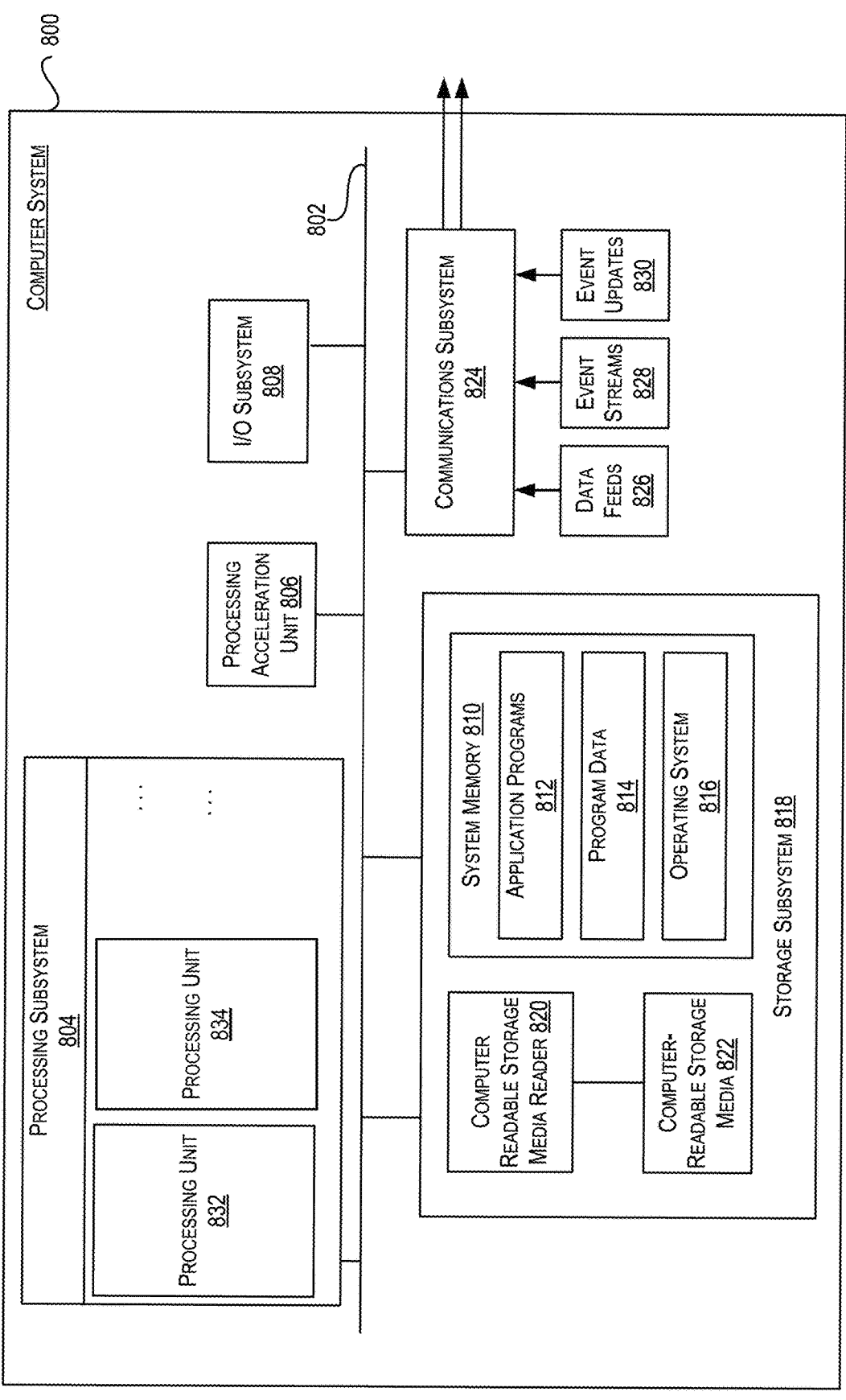
FIG. 8 illustrates an example computer system that may be used to implement certain aspects.

FIG. 8 illustrates an exemplary computer system 800 that may be used to implement certain aspects. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative aspects of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some aspects, processing subsystem 804 can include one or more special purpose co-processors such as graphics processors, digital signal processors (DSPs), or the like. In some aspects, some or all of the processing units of processing subsystem 804 can be implemented using customized circuits, such as application specific integrated circuits (ASICs), or field programmable gate arrays (FPGAs).

In some aspects, the processing units in processing subsystem 804 can execute instructions stored in system memory 810 or on computer readable storage media 822. In various aspects, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain aspects, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some aspects. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 822 may store programming and data constructs that provide the functionality of some aspects. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, digital video disc (DVD), a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 818 may also include a computer-readable storage media reader 820 that can further be connected to computer-readable storage media 822. Reader 820 may receive and be configured to read data from a memory device such as a disk, a flash drive, etc.

In certain aspects, computer system 800 may support virtualization technologies, including but not limited to virtualization of processing and memory resources. For example, computer system 800 may provide support for executing one or more virtual machines. In certain aspects, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain aspects, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 824 can provide wired network connectivity (e.g., Ethernet) in addition to or instead of a wireless interface.

Communication subsystem 824 can receive and transmit data in various forms. For example, in some aspects, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

receiving, in an application session between an application and a user-authenticated client device, a natural language request for information contained within a database, wherein, when the natural language request is received, the application constrains the user-authenticated client device based on one or more database access constraints that are not enforced in a database session between the application and a database;

generating a prompt to a large language model to generate a SQL request, wherein the prompt identifies one or more database structures for which the SQL request is to be directed and wherein the prompt comprises one or more items of metadata about at least one database structure of the one or more database structures, and wherein the prompt does not include the one or more database access constraints;

prompting the large language model with the prompt;

receiving a particular SQL request from the large language model as a result of the prompt, wherein the particular SQL request does not include a security predicate for the one or more database access constraints;

parsing the particular SQL request to identify a command to access one or more particular database structures for which at least one database access constraint of the one or more database access constraints applies;

determining a particular security predicate for the command based at least in part on the command and the at least one database access constraint of the one or more database access constraints:

appending the particular security predicate to the command in the particular SQL request to generate a modified SQL request, wherein the security predicate enforces the one or more database access constraints;

using the modified SQL request to access data in the database session, wherein the database session does not enforce the one or more database access constraints such that the database session is used to perform operations not constrained by the one or more database access constraints when the particular security predicate is not appended; and causing display, in the application session, of one or more visualizations based at least in part on a particular result of the modified SQL request.

2. The computer-implemented method of claim 1, wherein the one or more database structures corresponds to a pre-defined data view, determined based at least in part on a state of the application session, and wherein the determining the security predicate is based at least in part on the pre-defined data view.

3. The computer-implemented method of claim 1, wherein the determining the security predicate is based at least in part on a pre-defined data view, and wherein the method further comprises:

parsing the natural language request to detect a context of the natural language request; and selecting the pre-defined data view corresponding to the context of the natural language request.

4. The computer-implemented method of claim 1, further comprising:

generating the security predicate, at least in part by:

accessing a structured object comprising the at least one database access constraint; and transforming the at least one database access constraint into a WHERE clause, wherein the security predicate is based at least in part on the WHERE clause.

5. The computer-implemented method of claim 1, wherein the database session is a second database session, wherein the prompting the large language model is performed in a first database session separate from the second database session and wherein the particular result is inaccessible in the first database session.

6. The computer-implemented method of claim 1, wherein the database is a second database and wherein the database session is a second database session and wherein the method further comprises:

test-executing the modified SQL request against a first database in a first database session before using the modified SQL request to access the data from the second database in the second database session, wherein the first database includes at least some data values from the particular result.

7. The computer-implemented method of claim 1, wherein one or more data values of the at least one database structure are not accessible to the large language model, and wherein the one or more items of metadata comprise one or more items of natural language description that describe one or more data characteristics of the at least one database structure and are stored in association with the at least one database structure even though one or more data values of the at least one data structure are not accessible to the large language model.

8. The computer-implemented method of claim 1, further comprising: before generating the prompt, parsing the natural language request to identify one or more sensitive values; and replacing the one or more sensitive values with one or more default values.

9. The computer-implemented method of claim 8, wherein the parsing uses a tuple of a regular expression and a marker.

10. The computer-implemented method of claim 1, wherein the one or more visualizations comprise one or more graphical elements representing one or more aggregate values from a plurality of values of the particular result.

11. A computer-program product comprising one or more non-transitory machine-readable storage media, including stored instructions configured to cause a computing system to perform a set of actions including:

receiving, in an application session between an application and a user-authenticated client device, a natural language request for information contained within a database, wherein, when the natural language request is received, the application constrains the user-authenticated client device based on one or more database access constraints that are not enforced in a database session between the application and a database;

generating a prompt to a large language model to generate a SQL request, wherein the prompt identifies one or more database structures for which the SQL request is to be directed and wherein the prompt comprises one or more items of metadata about at least one database structure of the one or more database structures, and wherein the prompt does not include the one or more database access constraints;

prompting the large language model with the prompt;

receiving a particular SQL request from the large language model as a result of the prompt, wherein the particular SQL request does not include a security predicate for the one or more database access constraints;

parsing the particular SQL request to identify a command to access one or more particular database structures for which at least one database access constraint of the one or more database access constraints applies;

determining a particular security predicate for the command based at least in part on the command and the at least one database access constraint of the one or more database access constraints:

appending the particular security predicate to the command in the particular SQL request to generate a modified SQL request, wherein the security predicate enforces the one or more database access constraints;

using the modified SQL request to access data in the database session, wherein the database session does not enforce the one or more database access constraints such that the database session is used to perform operations not constrained by the one or more database access constraints when the particular security predicate is not appended; and causing display, in the application session, of one or more visualizations based at least in part on a particular result of the modified SQL request.

12. The computer-program product of claim 11, wherein the one or more database structures corresponds to a predefined data view, determined based at least in part on a state of the application session, and wherein the determining the security predicate is based at least in part on the pre-defined data view.

13. The computer-program product of claim 11, wherein the set of actions further includes:

generating the security predicate, at least in part by:

accessing a structured object comprising the at least one database access constraint; and transforming the at least one database access constraint into a WHERE clause, wherein the security predicate is based at least in part on the WHERE clause.

14. The computer-program product of claim 11, wherein one or more data values of the at least one database structure are not accessible to the large language model, and wherein the one or more items of metadata comprise one or more items of natural language description that describe one or more data characteristics of the at least one database structure and are stored in association with the at least one database structure even though one or more data values of the at least one data structure are not accessible to the large language model.

15. The computer-program product of claim 11, wherein the set of actions further includes:

before generating the prompt, parsing the natural language request to identify one or more sensitive values; and replacing the one or more sensitive values with one or more default values.

16. A system comprising:

one or more processors;

one or more non-transitory computer-readable media storing instructions, which, when executed by the system, cause the system to perform a set of actions including:

receiving, in an application session between an application and a user-authenticated client device, a natural language request for information contained within a database, wherein, when the natural language request is received, the application constrains the user-authenticated client device based on one or more database access constraints that are not enforced in a database session between the application and a database;

generating a prompt to a large language model to generate a SQL request, wherein the prompt identifies one or more database structures for which the SQL request is to be directed and wherein the prompt comprises one or more items of metadata about at least one database structure of the one or more database structures, and wherein the prompt does not include the one or more database access constraints;

prompting the large language model with the prompt;

receiving a particular SQL request from the large language model as a result of the prompt, wherein the particular SQL request does not include a security predicate for the one or more database access constraints;

parsing the particular SQL request to identify a command to access one or more particular database structures for which at least one database access constraint of the one or more database access constraints applies;

determining a particular security predicate for the command based at least in part on the command and the at least one database access constraint of the one or more database access constraints:

appending the particular security predicate to the command in the particular SQL request to generate a modified SQL request, wherein the security predicate enforces the one or more database access constraints;

using the modified SQL request to access data in the database session, wherein the database session does not enforce the one or more database access constraints such that the database session is used to perform operations not constrained by the one or more database access constraints when the particular security predicate is not appended; and causing display, in the application session, of one or more visualizations based at least in part on a particular result of the modified SQL request.

17. The system of claim 16, wherein the one or more database structures corresponds to a pre-defined data view, determined based at least in part on a state of the application session, and wherein the determining the security predicate is based at least in part on the pre-defined data view.

18. The system of claim 16, wherein the set of actions further includes:

generating the security predicate, at least in part by:

accessing a structured object comprising the at least one database access constraint; and transforming the at least one database access constraint into a WHERE clause, wherein the security predicate is based at least in part on the WHERE clause.

19. The system of claim 16, wherein one or more data values of the at least one database structure are not accessible to the large language model, and wherein the one or more items of metadata comprise one or more items of natural language description that describe one or more data characteristics of the at least one database structure and are stored in association with the at least one database structure even though one or more data values of the at least one data structure are not accessible to the large language model.

20. The system of claim 16, wherein the set of actions further includes:

before generating the prompt, parsing the natural language request to identify one or more sensitive values; and replacing the one or more sensitive values with one or more default values.

\* \* \* \* \*